US010638353B2

(12) United States Patent
Ahmadzadeh et al.

(10) Patent No.: US 10,638,353 B2
(45) Date of Patent: Apr. 28, 2020

(54) EVOLVED DATA COMPRESSION SCHEME FOR UNRELIABLE TRANSMISSION MODES

(71) Applicant: QUALCOMM Incorporated, San Diego, CA (US)

(72) Inventors: Seyed Ali Ahmadzadeh, San Jose, CA (US); Srinivasan Balasubramanian, San Diego, CA (US); Shailesh Maheshwari, San Diego, CA (US); Ashwini Raina, Mountain View, CA (US); Rohit Kapoor, Bangalore (IN); Vishal Dalmiya, San Diego, CA (US); Leena Zacharias, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 14/936,506

(22) Filed: Nov. 9, 2015

(65) Prior Publication Data

US 2016/0142932 A1 May 19, 2016

Related U.S. Application Data

(60) Provisional application No. 62/080,204, filed on Nov. 14, 2014.

(51) Int. Cl.
*H04W 4/00* (2018.01)
*H04W 28/02* (2009.01)
(Continued)

(52) U.S. Cl.
CPC ......... *H04W 28/0236* (2013.01); *H04L 69/04* (2013.01); *H04W 28/0278* (2013.01);
(Continued)

(58) Field of Classification Search
CPC ..... H04W 28/06; H04W 28/02; H04W 88/06; H04W 28/0278; H04W 28/065; H04W 28/0236; H04W 84/045; H04L 69/04
See application file for complete search history.

(56) References Cited

U.S. PATENT DOCUMENTS 6,320,843 B1 * 11/2001 Rydbeck ............... H04L 1/0003
370/207
7,620,870 B2 * 11/2009 Srinivasan ............. H04L 47/38
709/247

(Continued)

FOREIGN PATENT DOCUMENTS

CN          1326626 A      12/2001
CN        103974328 A       8/2014
(Continued)

OTHER PUBLICATIONS

ISA/EPO, International Search Report and Written Opinion of the International Searching Authority, Int'l. App. No. PCT/US2015/059906, dated Feb. 10, 2016, European Patent Office, Rijswijk, NL, 12 pgs.

(Continued)

*Primary Examiner* — Abdelillah Elmejjarmi
(74) *Attorney, Agent, or Firm* — Dalei Dong; Holland & Hart LLP

(57) ABSTRACT

Methods, systems, and devices are described for wireless communication at a device. A transmitting device such as a base station may select some packets for direct transmission to a receiving device using data compression based on the reliability of the direct connection. The transmitting device may select other packets for indirect transmission via an unreliable connection using uncompressed packets or compressed packets that will not be used to update a compression buffer. In some cases, uncompressed packets may also (Continued)

be sent via the reliable connection. If a packet sent over the unreliable connection is lost, it may be transmitted over the reliable connection.

27 Claims, 15 Drawing Sheets

(51) Int. Cl.
  *H04L 29/06*    (2006.01)
  *H04W 28/06*    (2009.01)
  *H04W 88/06*    (2009.01)
  *H04W 84/04*    (2009.01)

(52) U.S. Cl.
  CPC .......... *H04W 28/065* (2013.01); *H04W 28/06* (2013.01); *H04W 84/045* (2013.01); *H04W 88/06* (2013.01)

(56) References Cited

U.S. PATENT DOCUMENTS

| | | | |
|---|---|---|---|
| 2007/0064705 A1* | 3/2007 | Tateno | H04L 1/1614 370/394 |
| 2007/0070999 A1* | 3/2007 | Black | H04J 3/18 370/389 |
| 2010/0110971 A1* | 5/2010 | Kim | H04L 1/1614 370/315 |
| 2011/0002246 A1* | 1/2011 | Li | H04L 1/0043 370/310 |
| 2014/0092828 A1 | 4/2014 | Sirotkin | |
| 2014/0161036 A1* | 6/2014 | Venkatachalam Jayaraman | H04L 65/601 370/328 |
| 2014/0219329 A1* | 8/2014 | Seller | H03M 13/2721 375/240 |
| 2014/0286343 A1* | 9/2014 | Sung | H04L 45/24 370/400 |
| 2015/0249610 A1* | 9/2015 | Kanamarlapudi | H04L 47/22 370/230.1 |
| 2015/0326695 A1* | 11/2015 | Pang | H04L 69/04 370/477 |
| 2015/0358858 A1 | 12/2015 | Xue | |
| 2016/0134399 A1* | 5/2016 | Callard | H04L 5/0046 370/329 |
| 2016/0269740 A1* | 9/2016 | Choi | H04N 19/70 |

FOREIGN PATENT DOCUMENTS

| | | |
|---|---|---|
| CN | 103988546 A | 8/2014 |
| JP | 2017532846 A | 11/2017 |
| WO | WO-200030289 A1 | 5/2000 |
| WO | WO-2009045945 A2 | 4/2009 |
| WO | WO-2013068787 A1 | 5/2013 |
| WO | WO-2014060543 A1 | 4/2014 |
| WO | WO-2014110773 A1 | 7/2014 |
| WO | WO-2016064499 A1 | 4/2016 |

OTHER PUBLICATIONS

IPEA/EP, Second Written Opinion of the International Preliminary Examining Authority, Int'l Application No. PCT/US2015/059906, dated Oct. 14, 2016, European Patent Office, Rijswijk, NL, 6 pgs.
Blackberry UK Limited: "Further Discussion on U-Plane Protocol Architecture Designs", 3GPP TSG-RAN WG2 Meeting #83, R2-132442, Aug. 2013, pp. 1-6, URL: http://www.3gpp.org/ftp/tsg_ra.
Nokia Siemens Networks (Rapporteur): "TP for U-Plane Alternatives", 3GPP TSG-RAN WG2 Meeting #82, R2-132102, May 2013, 9 Pages, URL:http://www.3gpp.org/ftp/tsg_ra.

\* cited by examiner

EVOLVED DATA COMPRESSION SCHEME FOR UNRELIABLE TRANSMISSION MODES

CROSS REFERENCES

The present Application for Patent claims priority to U.S. Provisional Patent Application No. 62/080,204 by Ahmadzadeh et al., entitled "Evolved Data Compression Scheme for Unreliable Transmission Modes," filed Nov. 14, 2014, assigned to the assignee hereof, which is hereby incorporated by reference in its entirety.

BACKGROUND

Field of Disclosure

The present disclosure, for example, relates to wireless communication, and more specifically to evolved data compression scheme for unreliable transmission modes.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

In some cases, a UE may communicate with a base station both directly and via a less reliable connection such as through a Wi-Fi network. If compressed packets are sent via both connections, and a packet sent over the unreliable network is lost, the UE may not be able to efficiently decompress subsequent packets. For example, the decompression algorithm may reference data in the lost packet. This may result in a delay or a service disruption for the UE.

SUMMARY

The present disclosure may, for example, relate to wireless communications systems, and more particularly to improved systems, methods, or apparatuses for evolved data compression scheme for unreliable transmission modes. A transmitting device such as a base station may select some packets for direct transmission to a receiving device using data compression based on the reliability of the direct connection. The transmitting device may select other packets for indirect transmission via an unreliable connection using uncompressed packets or compressed packets that will not be used to update a compression buffer. In some cases, uncompressed packets may also be sent via the reliable connection. If a packet sent over the unreliable connection is lost, it may be transmitted over the reliable connection.

A method of wireless communication at a device is described. The method may include selecting a first data packet for transmission via a first wireless connection utilizing a first compression mode, transmitting the first data packet via the first wireless connection utilizing the first compression mode, selecting a second data packet for transmission via a second wireless connection utilizing a second compression mode, wherein selecting the second data packet is based at least in part on the second wireless connection being less reliable than the first wireless connection, and transmitting the second data packet via the second wireless connection utilizing the second compression mode.

An apparatus for wireless communication at a device is described. The apparatus may include means for selecting a first data packet for transmission via a first wireless connection utilizing a first compression mode, means for transmitting the first data packet via the first wireless connection utilizing the first compression mode, means for selecting a second data packet for transmission via a second wireless connection utilizing a second compression mode, wherein selecting the second data packet is based at least in part on the second wireless connection being less reliable than the first wireless connection, and means for transmitting the second data packet via the second wireless connection utilizing the second compression mode.

A further apparatus for wireless communication at a device is described. The apparatus may include a processor, memory in electronic communication with the processor, and instructions stored in the memory, wherein the instructions are executable by the processor to select a first data packet for transmission via a first wireless connection utilizing a first compression mode, transmit the first data packet via the first wireless connection utilizing the first compression mode, select a second data packet for transmission via a second wireless connection utilizing a second compression mode, wherein selecting the second data packet is based at least in part on the second wireless connection being less reliable than the first wireless connection, and transmit the second data packet via the second wireless connection utilizing the second compression mode.

A non-transitory computer-readable medium storing code for wireless communication at a device is described. The code may include instructions executable to select a first data packet for transmission via a first wireless connection utilizing a first compression mode, transmit the first data packet via the first wireless connection utilizing the first compression mode, select a second data packet for transmission via a second wireless connection utilizing a second compression mode, wherein selecting the second data packet is based at least in part on the second wireless connection being less reliable than the first wireless connection, and transmit the second data packet via the second wireless connection utilizing the second compression mode.

In some examples of the method, apparatuses, or non-transitory computer-readable medium described above, the first compression mode comprises compressing data packets, and the second compression mode comprises transmitting uncompressed data packets. Additionally or alternatively, some examples may include processes, features, means, or instructions for compressing the first data packet according to the first compression mode, and transmitting the second data packet in an uncompressed form according to the second compression mode. In some examples, the first wireless connection is an LTE connection and the second wireless connection is a Wi-Fi connection.

In some examples of the method, apparatuses, or non-transitory computer-readable medium described above, the first compression mode comprises compressing data packets and updating a buffer, and the second compression mode comprises compressing data packets and refraining from updating a buffer. Additionally or alternatively, some examples may include processes, features, means, or instructions for compressing the first data packet according to the first compression mode, updating the buffer based at least in part on the first data packet, compressing the second data packet according to the second compression mode based at least in part on the updated buffer, refraining from updating the buffer based on the second data packet, selecting a third data packet for transmission via the first wireless connection utilizing the first compression mode, and compressing the third data packet according to the first compression mode based at least in part on the updated buffer and the refraining from updating the buffer based on the second data packet.

In some examples of the method, apparatuses, or non-transitory computer-readable medium described above, the second compression mode comprises a header compression mode or a header plus payload compression mode. Additionally or alternatively, some examples may include processes, features, means, or instructions for transmitting a buffer update bypass indication corresponding to the second data packet.

Some examples of the method, apparatuses, or non-transitory computer-readable medium described above may further include processes, features, means, or instructions for transmitting a third data packet via the first wireless connection utilizing the second compression mode. Additionally or alternatively, some examples may include processes, features, means, or instructions for selecting the second data packet is based at least in part on a ratio of compressed and uncompressed data packets.

Some examples of the method, apparatuses, or non-transitory computer-readable medium described above may further include processes, features, means, or instructions for indicating the first compression mode in a packet type field in a compression header of the first data packet. Additionally or alternatively, some examples may include processes, features, means, or instructions for indicating the second compression mode in a packet type field in a compression header of the second data packet.

Some examples of the method, apparatuses, or non-transitory computer-readable medium described above may further include processes, features, means, or instructions for transmitting a third data packet via the first wireless connection utilizing the first compression mode, receiving a lost packet indicating a serial number of a third data packet, and retransmitting the third data packet based at least in part on the lost packet message, using a packet data convergence protocol (PDCP). Additionally or alternatively, some examples may include processes, features, means, or instructions for determining that a failure condition has been satisfied for the second data packet, and transmitting the second data packet via the first wireless connection based at least in part on the determination that failure condition has been satisfied.

In some examples of the method, apparatuses, or non-transitory computer-readable medium described above, the failure condition comprises a time-out timer. Additionally or alternatively, in some examples the failure condition comprises a number of packets transmitted via the first wireless connection with a sequence number higher than a sequence number of the second data packet.

A method of wireless communication at a device is described. The method may include establishing a first wireless connection with a transmitter, establishing a second wireless connection with the transmitter, wherein the second wireless connection is less reliable than the first wireless connection, receiving a first data packet from the transmitter via the first wireless connection utilizing a first compression mode, and receiving a second data packet from the transmitter via the second wireless connection utilizing a second compression mode, wherein the second compression mode is based at least in part on the second wireless connection being less reliable than the first wireless connection.

An apparatus for wireless communication at a device is described. The apparatus may include means for establishing a first wireless connection with a transmitter, means for establishing a second wireless connection with the transmitter, wherein the second wireless connection is less reliable than the first wireless connection, means for receiving a first data packet from the transmitter via the first wireless connection utilizing a first compression mode, and means for receiving a second data packet from the transmitter via the second wireless connection utilizing a second compression mode, wherein the second compression mode is based at least in part on the second wireless connection being less reliable than the first wireless connection.

A further apparatus for wireless communication at a device is described. The apparatus may include a processor, memory in electronic communication with the processor, and instructions stored in the memory, wherein the instructions are executable by the processor to establish a first wireless connection with a transmitter, establish a second wireless connection with the transmitter, wherein the second wireless connection is less reliable than the first wireless connection, receive a first data packet from the transmitter via the first wireless connection utilizing a first compression mode, and receive a second data packet from the transmitter via the second wireless connection utilizing a second compression mode, wherein the second compression mode is based at least in part on the second wireless connection being less reliable than the first wireless connection.

A non-transitory computer-readable medium storing code for wireless communication at a device is described. The code may include instructions executable to establish a first wireless connection with a transmitter, establish a second wireless connection with the transmitter, wherein the second wireless connection is less reliable than the first wireless connection, receive a first data packet from the transmitter via the first wireless connection utilizing a first compression mode, and receive a second data packet from the transmitter via the second wireless connection utilizing a second compression mode, wherein the second compression mode is based at least in part on the second wireless connection being less reliable than the first wireless connection.

In some examples of the method, apparatuses, or non-transitory computer-readable medium described above, the first compression mode comprises compressing data packets, and the second compression mode comprises transmitting uncompressed data packets. Additionally or alternatively, in some examples the first data packet is compressed and the second data packet is uncompressed, decompressing the first data packet, and receiving the second data packet comprises receiving the second data packet in an uncompressed form. In some examples, the first wireless connection is an LTE connection and the second wireless connection is a Wi-Fi connection.

In some examples of the method, apparatuses, or non-transitory computer-readable medium described above, the first compression mode comprises compressing data packets and updating a buffer, and the second compression mode comprises compressing data packets and refraining from updating the buffer. Additionally or alternatively, some examples may include processes, features, means, or instructions for decompressing the first data packet according to the first compression mode, updating the buffer based at least in part on the first data packet, decompressing the second data packet based at least in part on the updated buffer, refraining from updating the buffer based on the second data packet, receiving a third data packet based on the first compression mode, and decompressing the third data packet according to the first compression mode based at least in part on the updated buffer and the refraining from updating the buffer based on the second data packet.

In some examples of the method, apparatuses, or non-transitory computer-readable medium described above, the second compression mode comprises a header compression mode or a header plus payload compression mode. Additionally or alternatively, some examples may include processes, features, means, or instructions for receiving a third data packet via the first wireless connection utilizing the second compression mode.

Some examples of the method, apparatuses, or non-transitory computer-readable medium described above may further include processes, features, means, or instructions for identifying the first compression mode based at least in part on a packet type field in a compression header of the first data packet. Additionally or alternatively, some examples may include processes, features, means, or instructions for identifying the second compression mode based at least in part on a packet type field in a compression header of the second data packet.

Some examples of the method, apparatuses, or non-transitory computer-readable medium described above may further include processes, features, means, or instructions for determining that a third data packet has been lost, transmitting a lost packet message to the access network indicating a serial number of the third data packet, and receiving a retransmission corresponding to the third data packet based at least in part on the lost packet message, using a PDCP.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
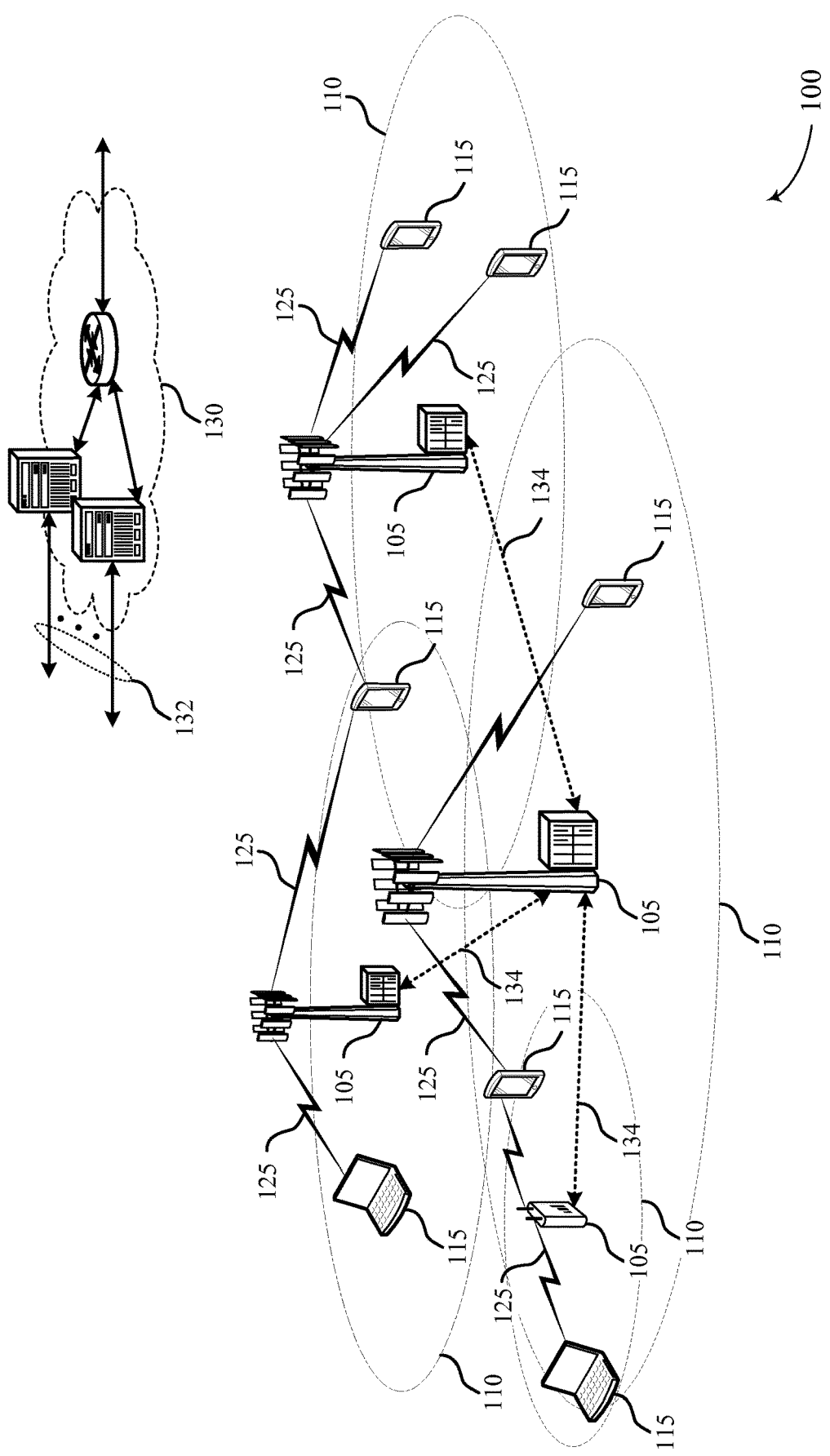
FIG. 1 illustrates an example of a wireless communications system for evolved data compression scheme for unreliable transmission modes in accordance with various aspects of the present disclosure.

The present disclosure may, for example, relate to improved systems, methods, or apparatuses for an evolved data compression scheme for unreliable transmission modes. In some wireless communication schemes, such as in a high speed packet access (HSPA) system, data compression may be used to increase bandwidth. Data compression may include header compression, payload compression, or both. The compression of data may happen at various layers within a communication system, including the packet data convergence protocol layer (PDCP). Additionally, the compression of data may be performed at base stations as well as user equipments (UEs). In some instances, the compression of packet headers and payloads may be based on previously transmitted packets. A wireless system which employs data compression may experience increased system capacity (e.g., by accommodating higher bandwidth and increased number of uses), faster data exchange (e.g., quicker web page downloads), improved call setup (e.g., during cell edge scenarios for session initiation protocol (SIP) procedures), and UE transmit power benefits.

Legacy compression algorithms may be based on reliable in-sequence delivery of all compressed packets in order to maintain compression buffer synchronicity between the transmitter and the receiver. In a single connection LTE configuration, each packet that arrives at a receiver may be delivered to the PDCP layer, which may be responsible for in-sequence delivery of packets to lower layers such as the radio link control (RLC) layer. An RLC acknowledged mode (AM) transmission may then guarantee in-order delivery of all transmitted packets. RLC unacknowledged mode (UM), however, may lack such guarantee. Legacy compression techniques may not be appropriate for such configurations.

The combination of LTE and an unreliable radio access technology (RAT) (e.g., Wi-Fi) is prone to the same problem. Packets that are transmitted over the unreliable RAT may be dropped, which may disrupt the buffer synchronization between the transmitter and the receiver. In order to handle unreliable RATs, the compression algorithm compression modes may be extended. In one alternative, compression may be implemented with no buffer update for packets sent over the unreliable RAT. This may be used for both header only and header plus payload compression. In this mode the compression is performed using the compression buffer, however, the packet contents are not used for updating the compression buffer. Thus, if a packet is lost or arrives out of sequence, synchronization may not be lost between the transmitter and the receiver. This may be different from a compression mode used for the reliable RAT (e.g., LTE) in which each received packet updates the buffer. The compression mode may be communicated to the receiver using the packet type field in the compression header. In another alternative, compressed packets may be sent over the reliable RAT and uncompressed packets may be sent over the unreliable RAT.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 for evolved data compression scheme for unreliable transmission modes in accordance with various aspects of the present disclosure. The wireless communications system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be used to describe the base stations 105, while the term UE may be used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell, for example, covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

In some cases, wireless communications system 100 may include small cells whose coverage areas 110 may overlap the coverage area 110 of one or more macro base stations 105. In some cases, small cells may be added in areas with high user demand or in areas not sufficiently covered by a macro base station 105. For example, a small cell may be located in a shopping center, or in an area where signal transmissions are blocked by terrain or buildings. In some cases, small cells may improve network performance by allowing macro base stations 105 to offload traffic when load is high. A network that includes both large and small cells may be known as a heterogeneous network. A heterogeneous network may also include Home eNBs (HeNBs) which may provide service to a restricted group known as a closed subscriber group (CSG). For example, an office building may contain small cells for use only by the occupants of the building. In some cases, heterogeneous networks may involve more complex network planning and interference mitigation techniques than homogenous networks.

In some cases, wireless communications system 100 may utilize multiple connections between a base station 105 and a UE 115. For example, a base station 105 may communicate directly with a UE 115, or it may communicate through a wireless local (WLAN) area network (e.g., Wi-Fi). In some cases, a base station 105 or a UE 115 may also communicate with another UE 115 via a third party UE 115.

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some examples of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communications system 100 may include an RLC layer that connects higher layers (e.g., RRC and PDCP) to the lower layers (e.g., the MAC layer). An RLC entity in a base station 105 or a UE 115 may ensure that transmission packets are organized into appropriately sized blocks (corresponding to the MAC layer transport block size). If an incoming data packet (i.e., a PDCP or an RRC SDU) is too big for transmission, the RLC layer may segment it into several smaller RLC protocol data units (PDUs). If the incoming packets are too small, the RLC layer may concatenate several of them into a single, larger RLC PDU. Each RLC PDU may include a header including information about how to reassemble the data. The RLC layer may also ensure that packets are reliably transmitted. The transmitter may keep a buffer of indexed RLC PDUs, and continue retransmission of each PDU until it receives the corresponding ACK. In some cases, the transmitter may send a Poll Request to determine which PDU's have been received and the receiver may respond with a Status Report. Unlike the MAC layer HARQ, RLC ARQ may not include a forward error correction function. An RLC entity may operate in one of three modes. In AM, UM and TM. In AM, the RLC entity may perform segmentation/concatenation and ARQ. This mode may be appropriate for delay tolerant or error sensitive transmissions. In UM, the RLC entity may perform segmentation/concatenation but not ARQ. This may be appropriate for delay sensitive or error tolerant traffic (e.g., VoLTE). TM only performs data buffering, and does not include either concatenation/segmentation or ARQ. TM may be used primarily for sending broadcast control information (e.g., the MIB and SIBs), paging messages, and RRC connection messages. Some transmissions may be sent without RLC (e.g., a RACH preamble and response).

According to the present disclosure, a transmitting device such as a base station 105 may select some packets for direct transmission to a receiving device such as a UE 115 using data compression based on the reliability of the direct connection. The transmitting device may select other packets for indirect transmission via an unreliable connection using uncompressed packets or compressed packets that will not be used to update a compression buffer. In some cases, uncompressed packets may also be sent via the reliable connection. If a packet sent over the unreliable connection is lost, it may be transmitted over the reliable connection.

Figure 2:
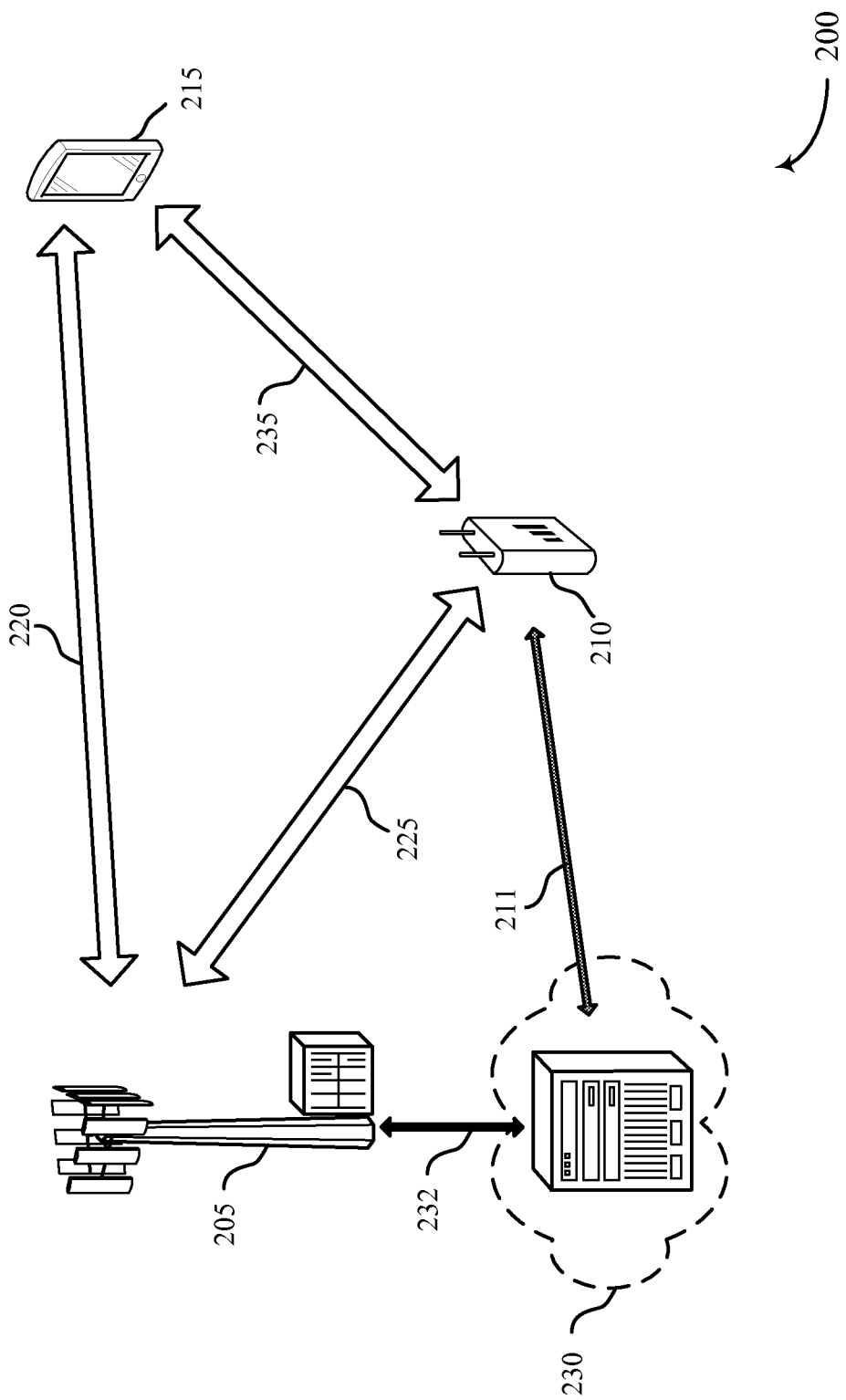
FIG. 2 illustrates an example of a wireless communications subsystem for evolved data compression scheme for unreliable transmission modes in accordance with various aspects of the present disclosure.

FIG. 2 illustrates an example of a wireless communications subsystem 200 for evolved data compression scheme for unreliable transmission modes in accordance with various aspects of the present disclosure. Wireless communication subsystem 200 may include a core network 230, base station 205, and UE 215, which may be examples of a core network 130, a base station 105, and a UE 115 described above with reference to FIG. 1. Wireless communication subsystem 200 may also include an access point (AP) 205 for an unreliable network (e.g., for a WLAN). Base station 205 and AP 210 may be collocated or non-collocated. User data may be served by either link (e.g., LTE or Wi-Fi radio links), such as when LTE is the reliable RAT and Wi-Fi is the unreliable RAT. In some cases, base station 205 may make the decision to switch bearers between LTE and Wi-Fi. In other cases, the selection decision may be made within core network 230. Thus, according to the present disclosure, the term "wireless device" may correspond to any device involved in wireless communications such as a base station 105, UE 115, or a component of a core network 130.

Wireless communication subsystem 200 illustrates an example of an evolved data compression scheme between base station 205 and UE 215. For example, communication between base station 205 and UE 215 may occur directly between base station 205 and UE 215, such as by using a first communication link 220 Additionally or alternatively, communication between base station 205 and UE 215 may involve another intermediate entity (e.g., AP 210). For example, base station 205 may communicate with AP 210 using a second communication link 225. Second communication link 225 may include a wireless link, a wired link (e.g., via a wired backhaul such as a copper or fiber optic cable), or both. In some cases, AP 210 may communicate with a core network 230 using interface link 211 (e.g., via an S2a or S2c interface, which may be a direct or an indirect link such as a link based on a tunneling protocol). AP 210 may further communicate with UE 215 using a third communication link 235. The communication links 211, 220, 225, 232, and 235 may be bidirectional communication links. In some cases, base stations 205 may interface with core network 230 through backhaul link 232 (e.g., S1, etc.), which may be an example of backhaul links 132 or 134 described above with reference to FIG. 1. The first communication link 220, the second communication link 225, or the third communication link 235 may be examples of communication links 125 or backhaul links 132, or 134 described above with reference to FIG. 1.

When communication occurs directly between base station 205 and UE 215, a first compression mode may be used. A compression mode may include a compression configuration to be used by base station 205 and UE 215. For example, a compression mode may include a configuration for compressing packet headers, compressing packet data, not compressing packets, using a specific compression algorithm and algorithm version, or combinations thereof. Additionally or alternatively, a compression mode may indicate whether or not a compression buffer (e.g., a base station compression buffer, a UE compression buffer, etc.) is to be updated. The first compression mode may include compressing packets and updating compression buffers. Therefore, base station 205 may compress a packet and update its compression buffer with data from the packet. The compressed packet may then be transmitted to UE 215 using the first communication link 220. Upon reception, UE 215 may decompress the packet and update its compression buffer with data from the packet. In some cases an initial packet is not compressed regardless of the compression mode, such as to populate at least one compression buffer and facilitate future compression.

In some cases, AP 210, and therefore the second communication link 225 and the third communication link 235, may be less reliable for communication than first communication link 220. Therefore, when communication between base station 205 and UE 215 involves AP 210 and communication links 225 and 235, a second compression mode may be used. In some cases, the second compression mode includes compressing packets and in other cases the second compression mode includes not compressing packets. If it involves data compression, the second compression mode may utilize some aspects of the first compression mode, but may involve refraining from updating compression buffers. By not updating compression buffers with packets from AP 210 the wireless communications subsystem 200 may reduce compression/decompression errors.

For each packet to be communicated between base station 205 and UE 215, a decision may be made whether to communicate using the first communication link 220, or the second communication link 225 and the third communication link 235. The decision of which communication link(s) to use may be based on the first communication link 220 being more reliable than the second communication link 225 and the third communication link 235. For example, higher priority packets may be communicated using the first communication link 220, while lower priority packets may be communicated using the second communication link 225 and the third communication link 235. In some cases, other factors may be used when determining the communication link(s) to use, such as network conditions, base station capabilities, number of retransmission attempts, type of packet to be communicated, bandwidth (e.g., bandwidth used, available bandwidth, etc.), frequency spectrum, power levels, etc.

For example, with Wi-Fi Offload, when a WLAN access point is available, some or all of the traffic may be routed through the WLAN access point, thus offloading traffic from direct cellular access (e.g., through an LTE network). Mobile operators may control what traffic is routed over WLAN and what traffic is kept on LTE. For example, some IP flows (e.g., related to VoIP or other operators' services) can be maintained over LTE to leverage its quality of service (QoS) capabilities, while IP flows related to "best-effort" Internet traffic can be offloaded to WLAN, i.e., Wi-Fi. Some wireless systems (e.g., systems based on the 3GPP LTE Rel. 8 Wi-Fi mobility framework) may enable seamless handover between a wireless wide area network (WWAN) and WLAN. Thus, according to certain aspects, a user may be simultaneously connected to a base station 105 such as an LTE eNB and an AP 210 such as a Wi-Fi AP, which may provide radio access links to transport a user's signaling and data traffic.

Figure 3:
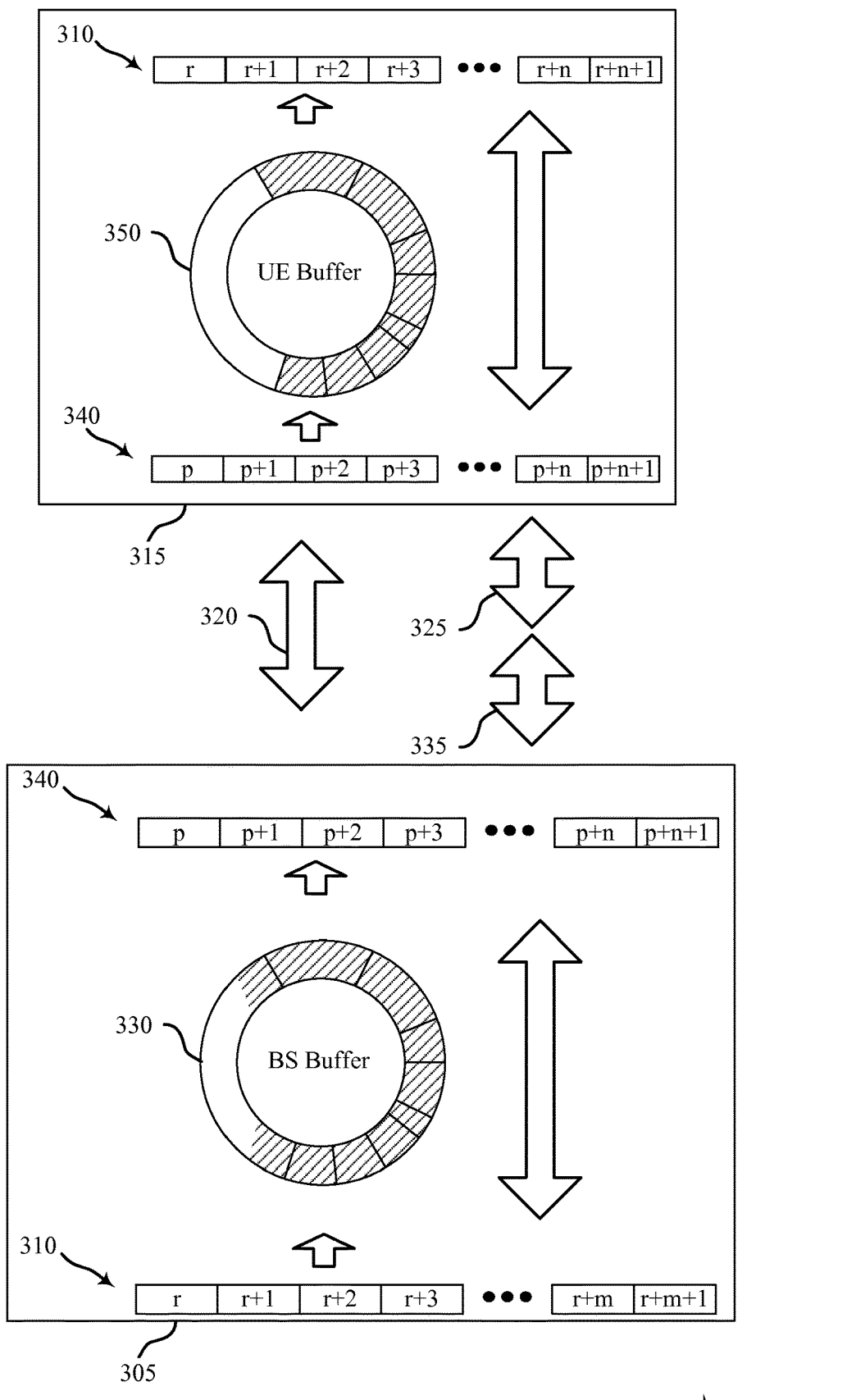
FIG. 3 illustrates an example of a data compression buffering process for evolved data compression scheme for unreliable transmission modes in accordance with various aspects of the present disclosure.

FIG. 3 illustrates an example of a data compression buffering process for evolved data compression scheme for unreliable transmission modes in accordance with various aspects of the present disclosure. Wireless communication system 300 may include UE 315, which may be an example of a UE 115 or UE 215 described above with reference to one or more of FIG. 1 or 2. Wireless communication system 300 may also include base station 305, which may be an example of a base station 105 or base station 205 described above with reference to one or more of FIG. 1 or 2. Wireless communication system 300 illustrates an example of an evolved data compression scheme between a base station 305 and a UE 315 in which data may be exchanged using compressed data packets over a first communication link 320, a second communication link 325, and a third communication link 335.

Prior to compressed packet communication, the base station 305 may configure UE 315 to use an evolved data compression scheme to enhance communications between UE 315 and the base station 305 (e.g., by using data compression techniques). According to a first compression mode, uncompressed data packets 310 (r through r+n+1) may be received by base station 305 and passed into base station compression buffer 330. A compression algorithm may be used to produce compressed data packets 340 (p through p+n+1), which may be transmitted to UE 315 via first communication link 320. Within UE 315, compressed data packets 340 (p through p+n+1) may be received from the base station 305, decompressed back into uncompressed data packets 310 (r through r+n+1), and used to update the UE compression buffer 350.

Compression and decompression may be accomplished by referencing data sequences in the compression buffer from prior packets instead of including the sequences themselves in the current data packet. Sending the packet without the selected sequences enables the compression. Thus, effective referencing (and hence, compression) may rely on synchronization of base station compression buffer 330 and UE compression buffer 350 because the currently received packet may be updated with a sequence received from an earlier received packet by the buffer. If synchronization is lost, the buffer may not successfully represent an earlier received sequence and the data sequences of the current packet may not be recovered. Thus, compression of packet headers and payloads based on prior packets sent may depend on reliable in-order delivery of compressed packets to maintain compression buffer synchronicity between the transmitter and the receiver.

According to one example of a second compression mode using second communication link 325 and third communication link 335, uncompressed data packets 310 (r through r+n+1) may be received by base station 305 and bypass the base station compression buffer 330. A compression algorithm may be used to produce compressed data packets 340 (p through p+n+1), which may be transmitted to UE 315 via first communication link 320. Within UE 315, compressed data packets 340 (p through p+n+1) may be received from the base station 305, decompressed back into uncompressed data packets 310 (r through r+n+1), and bypass the UE compression buffer 350. Compression and decompression of subsequent packets may rely on those packets that are used to update the buffers, and not on those that bypass the buffer update. However, even those packets that are not used to update the buffer may be compressed and decompressed using the data already in the buffer. According to another example of a second compression mode (not shown), data transmitted via communication links 325 and 335 may remain uncompressed.

Figure 4:
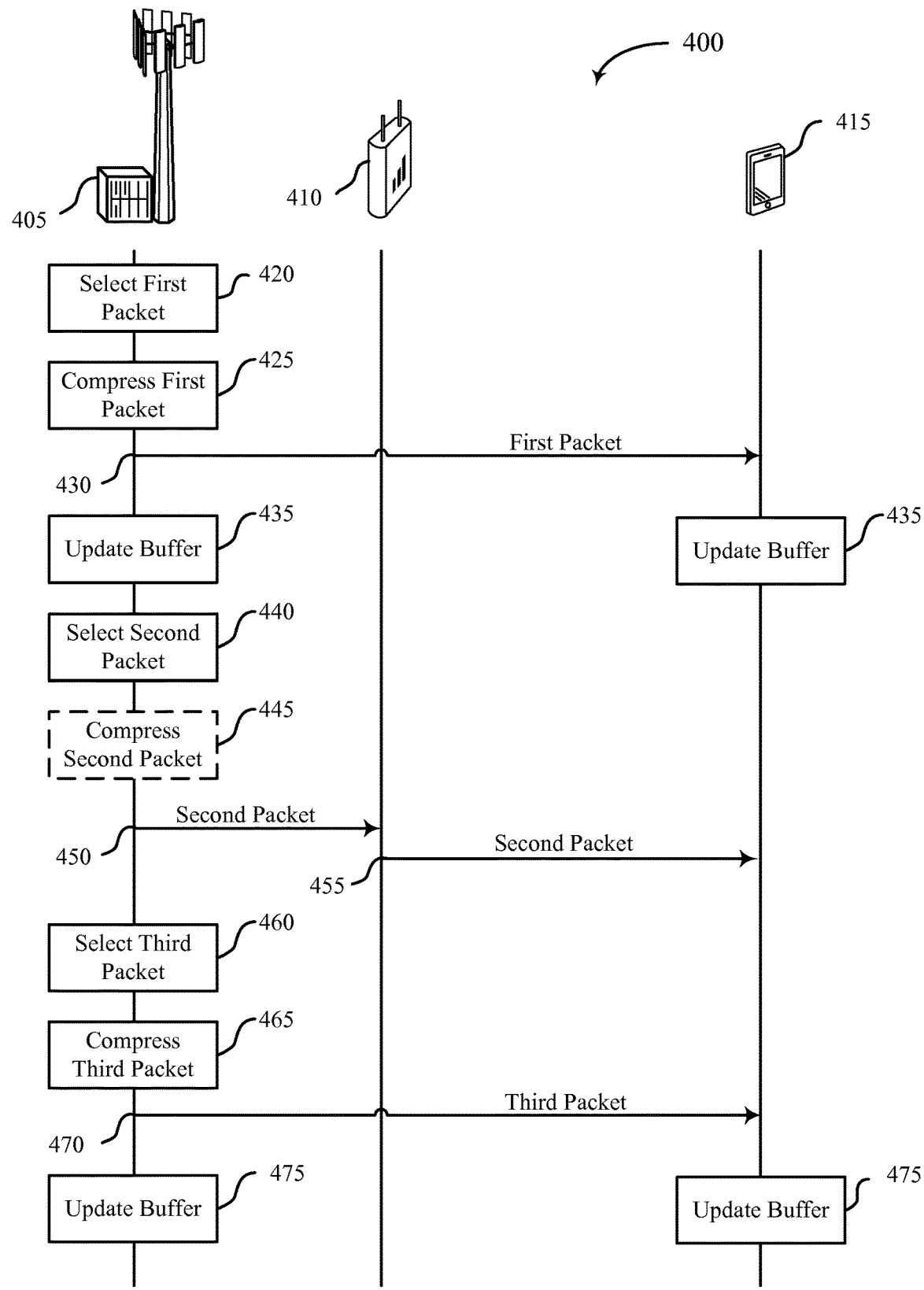
FIG. 4 illustrates an example of a process flow for evolved data compression scheme for unreliable transmission modes in accordance with various aspects of the present disclosure.

FIG. 4 illustrates an example of a process flow 400 for evolved data compression scheme for unreliable transmission modes in accordance with various aspects of the present disclosure. Process flow 400 may include UE 415 and base station 405, which may be examples of one or more of the UEs 115, 215, or 315, and one or more of the base stations 105, 205, or 305 described above with reference to FIG. 1, 2, or 3. Process flow 400 may also include AP 410, which may be an example of an AP 210 described above with reference to FIG. 2. Process flow 400 represents one example of the methods described in the present disclosure, but other examples may also be implemented. For instance, the steps described as being accomplished by base station 405 may be accomplished by UE 415 and vice versa.

At step 420, base station 405 may select a first data packet for transmission via a first wireless connection utilizing a first compression mode. At step 425, base station 405 may compress the first data packet according to the first compression mode. At step 430, base station 405 may transmit the first data packet to UE 415 via the first wireless connection utilizing the first compression mode.

At step 435, base station 405 and UE 415 may update a buffer based at least in part on the first data packet. UE 415 may decompress the first data packet according to the first compression mode. At step 440, base station 405 may select a second data packet for transmission via a second wireless connection utilizing a second compression mode, wherein selecting the second data packet is based at least in part on the second wireless connection being less reliable than the first wireless connection.

In some examples, at step 445 base station 405 may compress the second data packet according to the second compression mode based on the unreliability of the link passing through AP 410. However, in some examples the second data packet may remain uncompressed. In some examples the first or second compression modes may include a header compression mode or a header plus payload compression mode.

In some examples, at step 450 base station 405 may transmit the second data packet via the second wireless connection utilizing the second compression mode. In some examples, base station 405 may transmit the second data packet in an uncompressed form according to the second compression mode. In some examples, base station 405 may also transmit a buffer update bypass indication corresponding to the second data packet (not shown) which may indicate that there is no buffer update. Selection of the second data packet (and other packets transmitted over the unreliable link) may be based on a ratio of compressed and uncompressed data packets or other traffic conditions such as bandwidth over the different links and packet priority.

At step 455, the second data packet may be received by AP 410 and then passed on to UE 415. Regardless of whether it is compressed or uncompressed, the second data packet may not be used to update the buffer. That is, base station 405 and UE 415 may refrain from updating the buffer based on the second data packet even if it decompresses the packet.

Base station 405 may indicate the first compression mode in a packet type field in a compression header of the first data packet, and may also indicate the second compression mode in a packet type field in a compression header of the second data packet.

At step 460, base station 405 may select a third data packet for transmission via the first wireless connection utilizing the first compression mode. At step 465, base station 405 may compress the third data packet according to the first compression mode based at least in part on the updated buffer, (which does not include data from the second data packet).

At step 470, base station 405 may transmit the third data packet to UE 415, and UE 415 may decompress the third data packet based on the updated buffer. At step 475, base station 405 and UE 415 may update their buffers based on the third packet.

In some cases, base station 405 may receive a lost packet message from UE 415 indicating a serial number of a third data packet and may retransmit the third data packet based at least in part on the lost packet message, (e.g., using a packet data convergence protocol (PDCP)). In some cases, each packet may have a PDCP sequence number (SN) which may be used at the receiving buffer to put packets back in order. In some cases, if a packet is lost the receiving entity may send feedback to the transmitting entity indicating the lost PDCP SN and the transmitter may retransmit the PDCP PDU. The receiver may perform decompression on each received compressed packet if all the previous sequence numbers are received and decompressed.

In some cases, base station 405 may determine that a failure condition has been satisfied for the second data packet and may transmit the second data packet again via the first wireless connection based at least in part on the determination that failure condition has been satisfied. In some examples the failure condition comprises a time-out timer. In some examples the failure condition comprises a number of packets transmitted via the first wireless connection with a sequence number higher than a sequence number of the second data packet.

Figure 5:
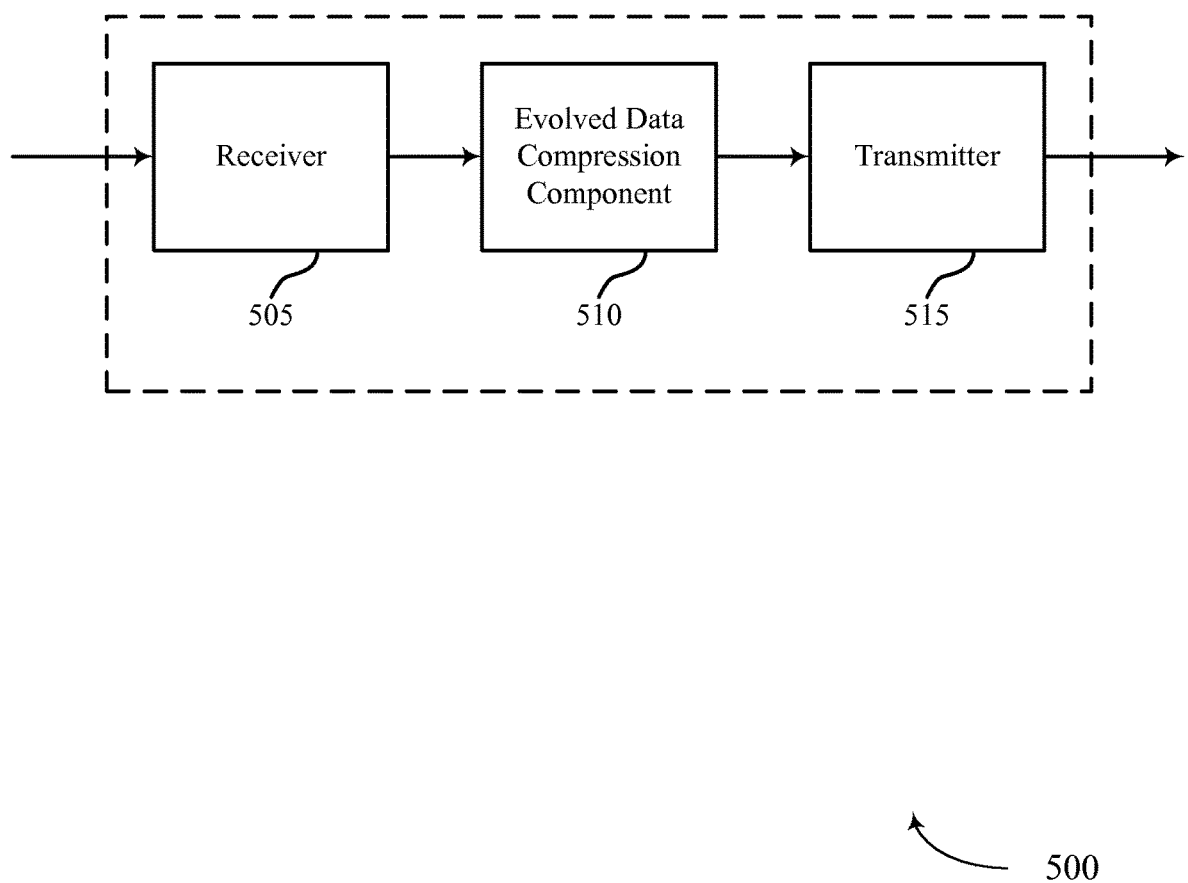
FIG. 5 shows a block diagram of a wireless device configured for evolved data compression scheme for unreliable transmission modes in accordance with various aspects of the present disclosure.

FIG. 5 shows a block diagram of a wireless device 500 configured for evolved data compression scheme for unreliable transmission modes in accordance with various aspects of the present disclosure. Wireless device 500 may be an example of aspects of one or more of the UEs 115, 215, 315, or 415, or one or more of the base stations 105, 205, 305, or 405 described with reference to FIG. 1, 2, 3, or 4. Wireless device 500 may include a receiver 505, an evolved data compression component 510, and a transmitter 515. Wireless device 500 may also include a processor. Each of these components may be in communication with each other.

The components of wireless device 500 may, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 505 may receive information such as packets, user data, or control information associated with various information channels (e.g., control channels, data channels, and information related to evolved data compression scheme for unreliable transmission modes, etc.). Information may be passed on to the evolved data compression component 510, and to other components of wireless device 500.

The evolved data compression component 510 may select a first data packet for transmission via a first wireless connection utilizing a first compression mode, transmit the first data packet via the first wireless connection utilizing the first compression mode, select a second data packet for transmission via a second wireless connection utilizing a second compression mode, wherein selecting the second data packet is based at least in part on the second wireless connection being less reliable than the first wireless connection, and transmit the second data packet via the second wireless connection utilizing the second compression mode.

The transmitter 515 may transmit signals received from other components of wireless device 500. In some examples, the transmitter 515 may be collocated with the receiver 505 in a transceiver component. The transmitter 515 may include a single antenna, or it may include a plurality of antennas.

Figure 6:
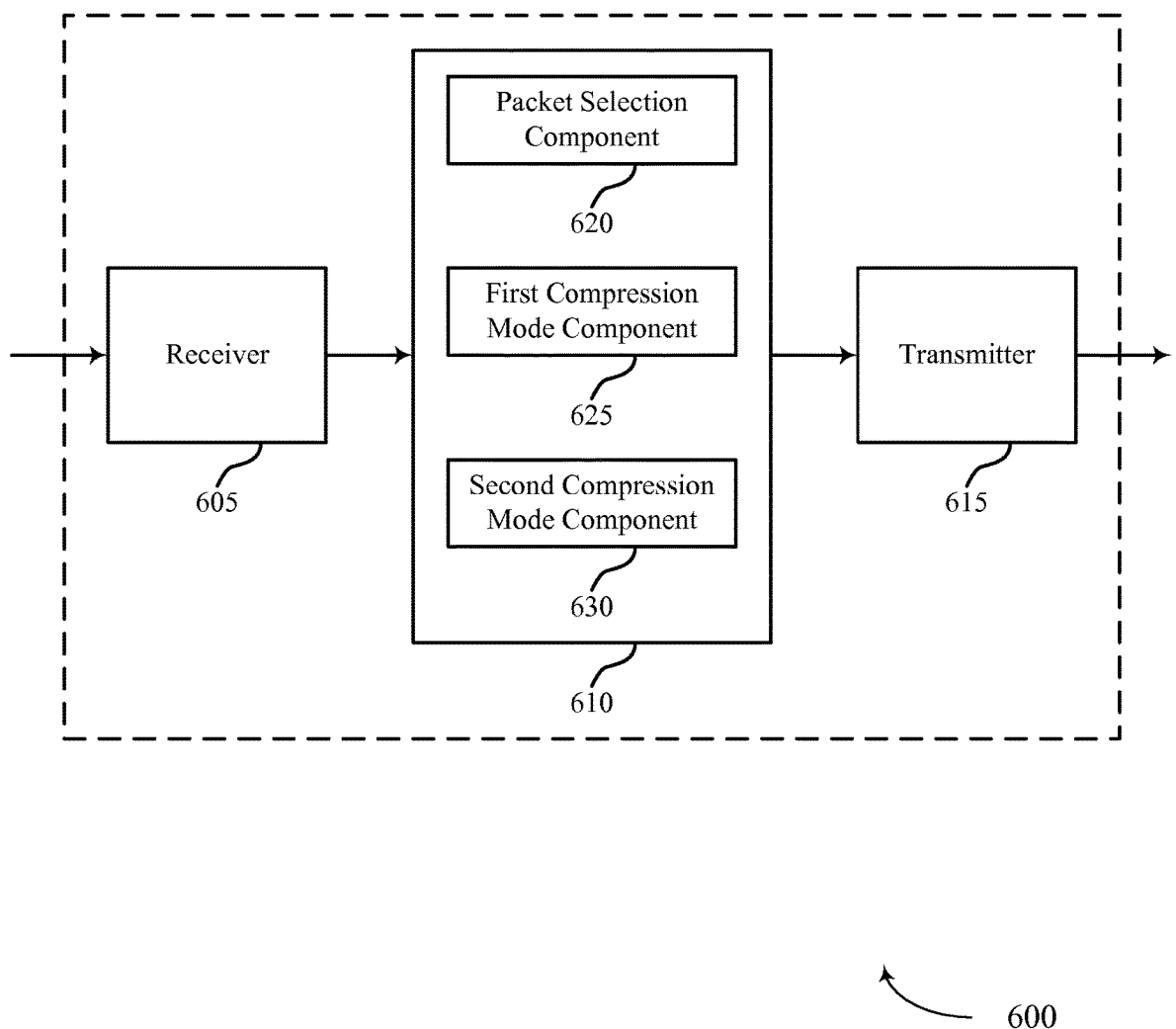
FIG. 6 shows a block diagram of a wireless device configured for evolved data compression scheme for unreliable transmission modes in accordance with various aspects of the present disclosure.

FIG. 6 shows a block diagram of a wireless device 600 configured for evolved data compression scheme for unreliable transmission modes in accordance with various aspects of the present disclosure. Wireless device 600 may be an example of aspects of one or more of the base stations 105, 205, 305, or 405, aspects of one or more of the UEs 115, 215, 315, or 415, or aspects of the wireless device 500 described with reference to FIG. 1, 2, 3, 5, or 5. Wireless device 600 may include a receiver 605, an evolved data compression component 610, or a transmitter 615. Wireless device 600 may also include a processor. Each of these components may be in communication with each other. The evolved data compression component 610 may also include a packet selection component 620, a first compression mode component 625, and a second compression mode component 630.

The components of wireless device 600 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 605 may receive information which may be passed on to evolved data compression component 615, and to other components of wireless device 600. The evolved data compression component 610 may perform the operations described above with reference to FIG. 5. The transmitter 615 may transmit signals received from other components of wireless device 600.

The packet selection component 620 may select a first data packet for transmission via a first wireless connection utilizing a first compression mode as described above with reference to FIG. 2, 3, or 4. The packet selection component 620 may also select a second data packet for transmission via a second wireless connection utilizing a second compression mode, wherein selecting the second data packet is based at least in part on the second wireless connection being less reliable than the first wireless connection.

The first compression mode component 625 may transmit the first data packet via the first wireless connection utilizing the first compression mode as described above with reference to FIG. 2, 3, or 4. In some examples, the first compression mode comprises compressing data packets. The first compression mode component 625 may compress the first data packet according to the first compression mode. In some examples, the first compression mode comprises compressing data packets and updating a buffer. The first compression mode component 625 may also select a third data packet for transmission via the first wireless connection utilizing the first compression mode. The first compression mode component 625 may compress the third data packet according to the first compression mode based at least in part on the updated buffer and refraining from updating the buffer based on the second data packet. The first compression mode component 625 may also transmit a third data packet via the first wireless connection utilizing the first compression mode.

The first compression mode component 625 may also receive a first data packet from the transmitter via the first wireless connection utilizing a first compression mode. The first compression mode component 625 may also decompress the first data packet. In some examples, the first compression mode comprises compressing data packets and updating a buffer. The first compression mode component 625 may decompress the first data packet according to the first compression mode. The first compression mode component 625 may also receive a third data packet based on the first compression mode. The first compression mode component 625 may decompress the third data packet according to the first compression mode based at least in part on the updated buffer and the refraining from updating the buffer based on the second data packet.

The second compression mode component 630 may transmit the second data packet via the second wireless connection utilizing the second compression mode as described above with reference to FIG. 2, 3, or 4. In some examples, the second compression mode comprises transmitting uncompressed data packets. In one example this involves transmitting uncompressed packets over the unreliable RAT (e.g., Wi-Fi). The uncompressed packets may be selected to be transmitted over the unreliable link when the link has the capacity to transmit the packets. The transmission of uncompressed packets may also be guarded by a time-out timer at the transmitter. When the timer is expired, the uncompressed packet may be transmitted over either link depending on available resources. In some examples, the second compression mode comprises compressing data packets and refraining from updating a buffer. The second compression mode component 630 may compress the second data packet according to the second compression mode based at least in part on the updated buffer. The second compression mode component 630 may also refrain from updating the buffer based on contents of the second data packet. Thus, if a packet is lost or arrives out of order at the receiver, synchronization may not be lost between the transmitter and receiver. The ratio of packets that are compressed with no buffer update can be calculated using the information on the available resources on reliable and unreliable network (e.g., LTE and Wi-Fi) interfaces. The second compression mode component 630 may also transmit a buffer update bypass indication corresponding to the second data packet. The second compression mode component 630 may also transmit a third data packet via the first wireless connection utilizing the second compression mode.

The second compression mode component 630 may also receive a second data packet from the transmitter via the second wireless connection utilizing a second compression mode, wherein the second compression mode is based at least in part on the second wireless connection being less reliable than the first wireless connection. In some examples, receiving the second data packet comprises receiving the second data packet in an uncompressed form. The second compression mode component 630 may decompress the second data packet based at least in part on the updated buffer. The second compression mode component 630 may refrain from updating the buffer based on the second data packet. The second compression mode component 630 may also receive a third data packet via the first wireless connection utilizing the second compression mode.

Figure 7:
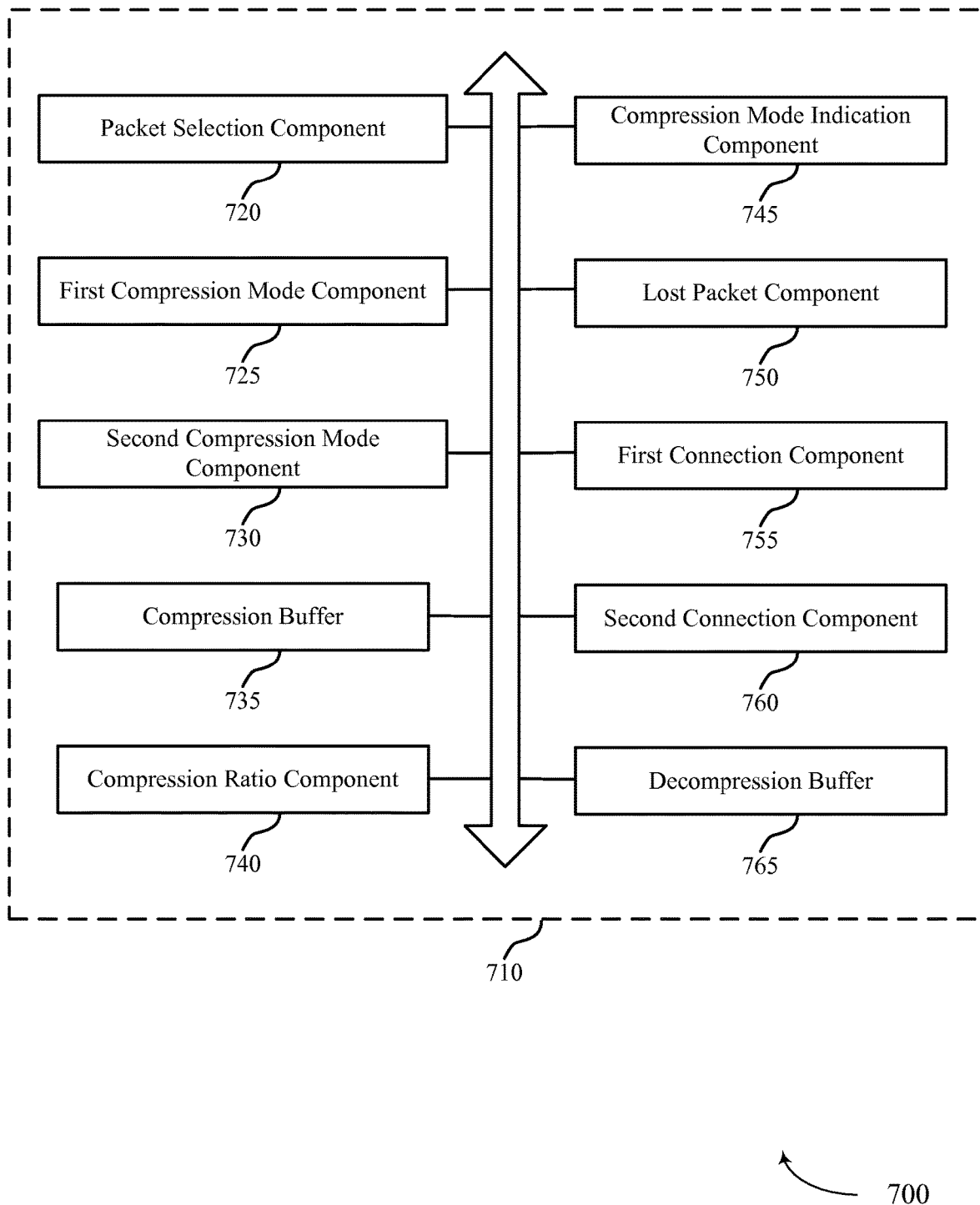
FIG. 7 shows a block diagram of an evolved data compression component configured for evolved data compression scheme for unreliable transmission modes in accordance with various aspects of the present disclosure.

FIG. 7 shows a block diagram 700 of an evolved data compression component 710, which may be a component of the wireless device 500 described with reference to FIG. 5 or the wireless device 600 described with reference to FIG. 6, configured for evolved data compression scheme for unreliable transmission modes in accordance with various aspects of the present disclosure. The evolved data compression component 710 may be an example of aspects of the evolved data compression component 510 or the evolved data compression component 610 described with reference to FIG. 5 or 6. The evolved data compression component 710 may include a packet selection component 720, a first compression mode component 725, and a second compression mode component 730. Each of these components may perform the functions described above with reference to FIG. 6. The evolved data compression component 710 may also include a compression buffer 735, a compression ratio component 740, a compression mode indication component 745, a lost packet component 750, a first connection component 755, a second connection component 760, and a decompression buffer 765.

The components of the evolved data compression component 710 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The compression buffer 735 may update the buffer based at least in part on the first data packet as described above with reference to FIG. 2, 3, or 4. The compression ratio component 740 may select the second data packet is based at least in part on a ratio of compressed and uncompressed data packets as described above with reference to FIG. 2, 3, or 4.

The compression mode indication component 745 may indicate the first compression mode in a packet type field in a compression header of the first data packet as described above with reference to FIG. 2, 3, or 4. The compression mode indication component 745 may also indicate the second compression mode in a packet type field in a compression header of the second data packet. The compression mode indication component 745 may also identify the first compression mode based at least in part on a packet type field in a compression header of the first data packet. The compression mode indication component 745 may also identify the second compression mode based at least in part on a packet type field in a compression header of the second data packet.

The lost packet component 750 may determine that a third data packet has been lost. The lost packet component 750 may receive a lost packet message indicating a serial number of a third data packet as described above with reference to FIG. 2, 3, or 4. The lost packet component 750 may also retransmit the third data packet based at least in part on the lost packet message, using a PDCP. The lost packet component 750 may also transmit a lost packet message to the access network indicating a serial number of the third data packet. The lost packet component 750 may also receive a retransmission corresponding to the third data packet based at least in part on the lost packet message, using a PDCP.

The first connection component 755 may establish a first wireless connection with a transmitter as described above with reference to FIG. 2, 3, or 4. In some cases, the first wireless connection is a direct wireless connection. The second connection component 760 may establish a second wireless connection with the transmitter, wherein the second wireless connection is less reliable than the first wireless connection as described above with reference to FIG. 2, 3, or 4. In some cases the second wireless connection is an indirect wireless connection (e.g., via a Wi-Fi network). The decompression buffer 765 may update the buffer based at least in part on the first data packet as described above with reference to FIG. 2, 3, or 4.

Figure 8:
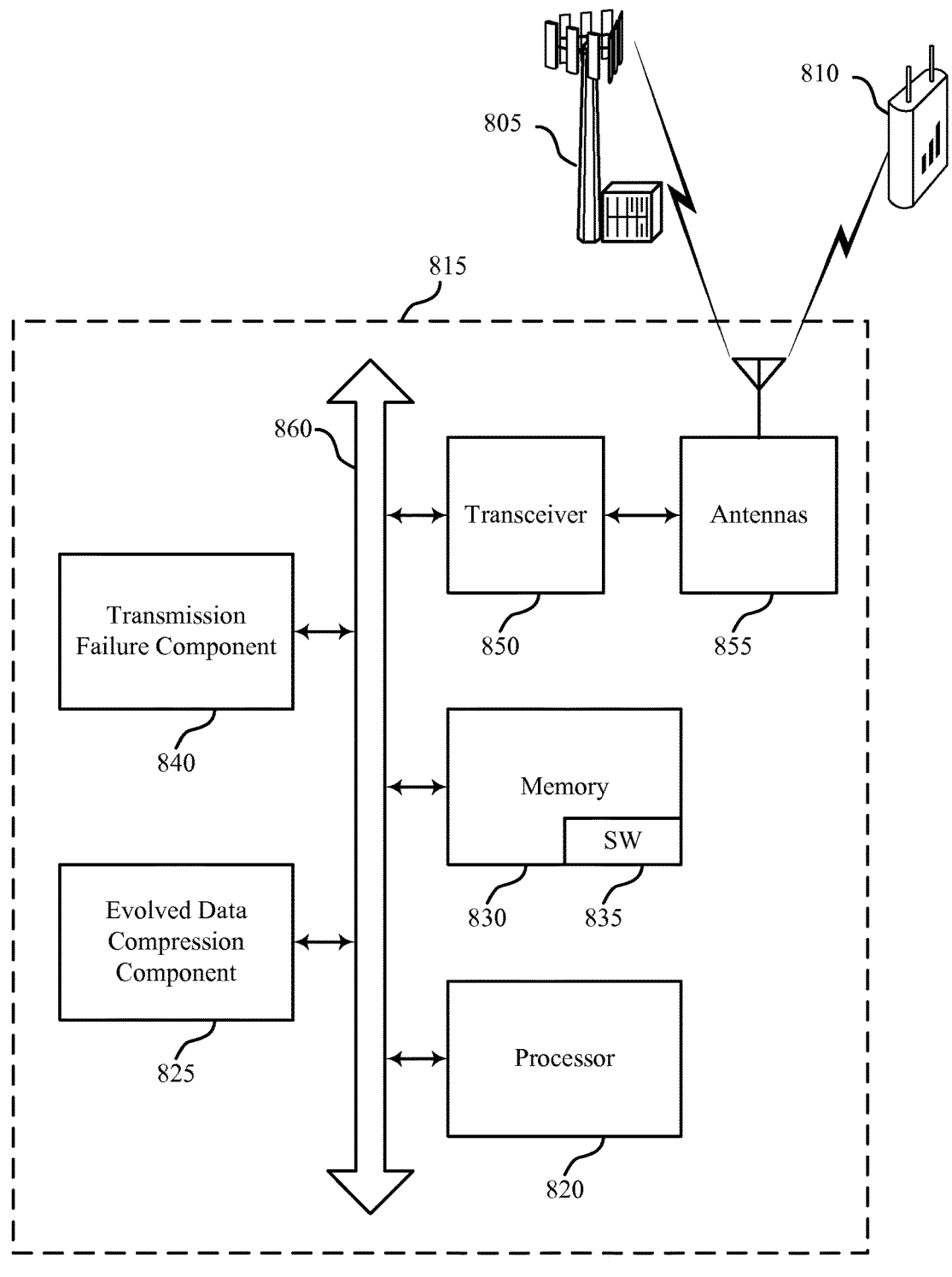
FIG. 8 illustrates a block diagram of a system including a UE configured for evolved data compression scheme for unreliable transmission modes in accordance with various aspects of the present disclosure.

FIG. 8 illustrates a block diagram of a system 800 including a UE 815 configured for evolved data compression scheme for unreliable transmission modes in accordance with various aspects of the present disclosure. System 800 may include UE 815, which may be an example of aspects of the wireless device 500, the wireless device 600, or one or more of the UEs 115, 215, 315, or 415 described above with reference to FIG. 1, 2, 3, 4, 5, 6, or 7. UE 815 may include an evolved data compression component 810, which may be an example of the evolved data compression components 510, 610, or 710 described with reference to FIG. 5, 6, or 7. UE 815 may also include a transmission failure component 840. UE 815 may also include components for bi-directional voice and data communications including components for transmitting communications and components for receiving communications. For example, UE 815 may communicate bi-directionally with base station 805 or AP 810.

The transmission failure component 840 may determine that a failure condition has been satisfied for the second data packet as described above with reference to FIG. 2, 3, or 4. The transmission failure component 840 may also transmit the second data packet via the first wireless connection based at least in part on the determination that failure condition has been satisfied. In some examples, the failure condition comprises a time-out timer. In some examples, the failure condition comprises a number of packets transmitted via the first wireless connection with a sequence number higher than a sequence number of the second data packet.

UE 815 may also include a processor component 820, and memory 830 (including software (SW) 835), a transceiver component 850, and one or more antenna(s) 855, each of which may communicate, directly or indirectly, with one another (e.g., via buses 860). The transceiver component 850 may communicate bi-directionally, via the antenna(s) 855 or wired or wireless links, with one or more networks, as described above. For example, the transceiver component 850 may communicate bi-directionally with one or more of the base stations 105, 205, 305, or 405 described with reference to FIG. 1, 2, 3, or 3, or may communicate bi-directionally with another of the one or more UEs 115, 215, 315, or 415 described with reference to FIG. 1, 2, 3, or 4. The transceiver component 835 may include a modem to modulate the packets and provide the modulated packets to the antenna(s) 855 for transmission, and to demodulate packets received from the antenna(s) 855. While UE 815 may include a single antenna, UE 815 may also have multiple antennas 855 capable of concurrently transmitting or receiving multiple wireless transmissions.

The memory 830 may include random access memory (RAM) and read only memory (ROM). The memory 8830 may store computer-readable, computer-executable software/firmware code 835 including instructions that, when executed, cause the processor component 820 to perform various functions described herein (e.g., evolved data compression scheme for unreliable transmission modes, etc.). Alternatively, the software/firmware code 835 may not be directly executable by the processor component 820 but cause a computer (e.g., when compiled and executed) to perform functions described herein. The processor component 820 may include an intelligent hardware device, (e.g., a central processing unit (CPU), a microcontroller, an ASIC, etc.)

Figure 9:
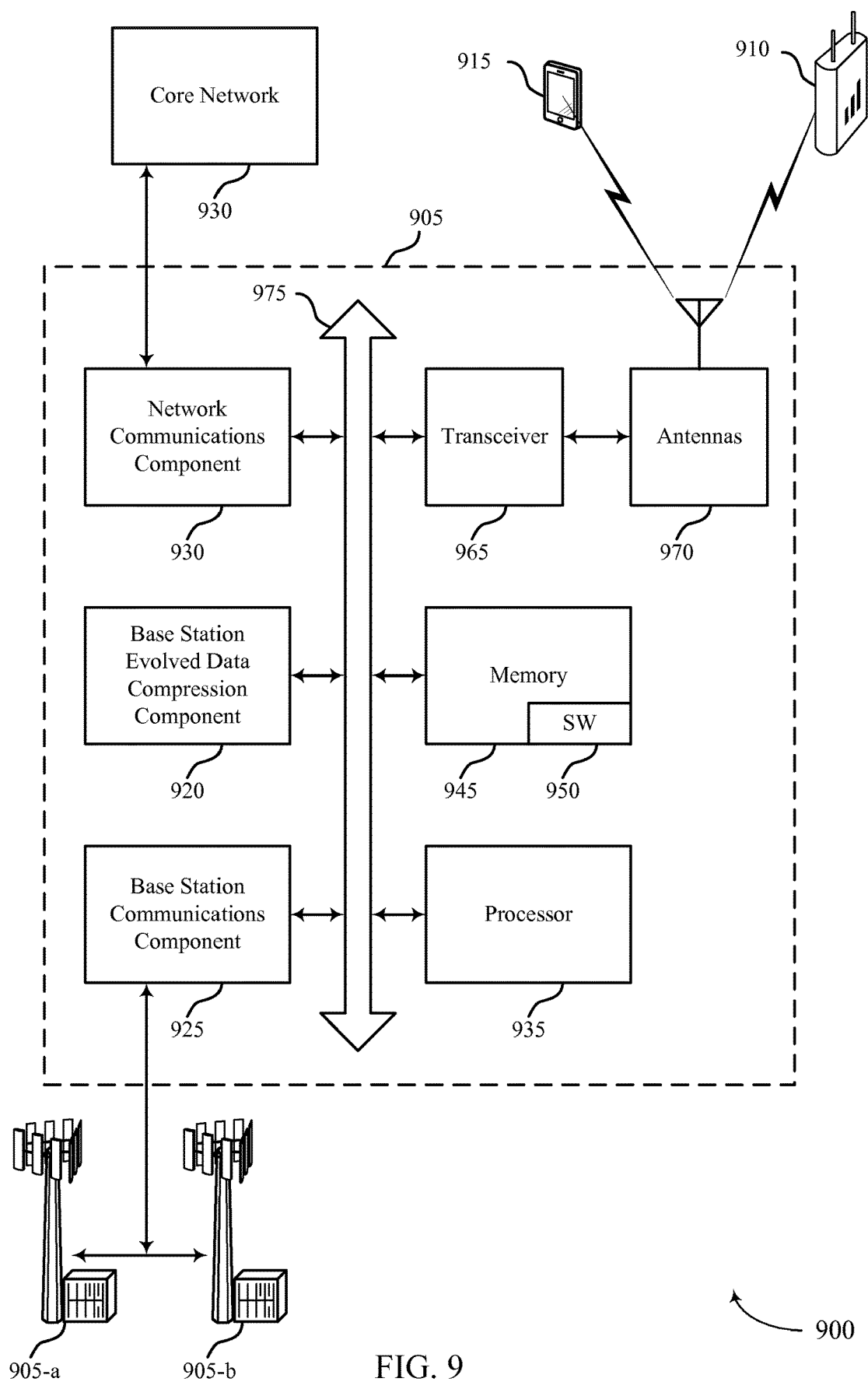
FIG. 9 illustrates a block diagram of a system including a base station configured for evolved data compression scheme for unreliable transmission modes in accordance with various aspects of the present disclosure.

FIG. 9 illustrates a block diagram of a system 900 including a base station 905 configured for evolved data compression scheme for unreliable transmission modes in accordance with various aspects of the present disclosure. System 900 may include base station 905, which may be an example of aspects of the wireless device 500, the wireless device 600, or one or more of the base stations 105, 205, 305, or 405 described above with reference to FIG. 1, 2, 3, 4, 5, 6, or 8. Base Station 905 may include a base station evolved data compression component 925, which may be an example of an evolved data compression component described with reference to FIG. 5, 6, or 7. Base Station 905 may also include components for bi-directional voice and data communications including components for transmitting communications and components for receiving communications. For example, base station 905 may communicate bi-directionally with AP 910 or UE 915.

In some cases, base station 905 may have one or more wired backhaul links. Base station 905 may have a wired backhaul link (e.g., S1 interface, etc.) to the core network 930. Base station 905 may also communicate with other base stations, such as base station 905-a and base station 905-b via inter-base station backhaul links (e.g., an X2 interface). Each of the one or more base stations 905 may communicate with one or more UEs using the same or different wireless communications technologies. In some cases, base station 905 may communicate with other base stations such as base station 905-a or base station 905-b utilizing base station communications component 925. In some examples, base station communications component 925 may provide an X2 interface within an LTE/LTE-A wireless communication network technology to provide communication between some of the base stations. In some examples, base station 905 may communicate with other base stations through core network 930. In some cases, base station 905 may communicate with the core network 930 through network communications component 930.

The base station 905 may include a processor component 935, memory 945 (including software (SW) 950), transceiver component 965, and antenna(s) 970, which each may be in communication, directly or indirectly, with one another (e.g., over bus system 975). The transceiver component 965 may be configured to communicate bi-directionally, via the antenna(s) 970, with one or more UEs or APs, such as one or more of the UEs 115, 215, 315, or 415 described with reference to FIG. 1, 2, 3, or 4, or one or more of the APs 210, 410, or 810 described with reference to FIG. 2, 4, or 8, which may be multi-mode devices. The transceiver component 965 (or other components of the base station 905) may also be configured to communicate bi-directionally, via the antennas 970, with one or more other base stations (not shown). The transceiver component 965 may include a modem configured to modulate the packets and provide the modulated packets to the antennas 970 for transmission, and to demodulate packets received from the antennas 970. The base station 905 may include multiple transceiver components 965, each with one or more associated antennas 970. The transceiver component may be an example of a combined receiver 505 and transmitter 515 of FIG. 5.

The memory 945 may include RAM and ROM. The memory 945 may also store computer-readable, computer-executable software code 950 containing instructions that are configured to, when executed, cause the processor component 935 to perform various functions described herein (e.g., evolved data compression scheme for unreliable transmission modes, selecting coverage enhancement techniques, call processing, database management, message routing, etc.). Alternatively, the software 950 may not be directly executable by the processor component 935 but be configured to cause the computer, e.g., when compiled and executed, to perform functions described herein. The processor component 935 may include an intelligent hardware device, e.g., a CPU, a microcontroller, an ASIC, etc. The processor component 935 may include various special purpose processors such as encoders, queue processing components, base band processors, radio head controllers, digital signal processor (DSPs), and the like.

The base station communications component 925 may manage communications with other base stations, such as base station 905-a and base station 905-b. The communications management component may include a controller or scheduler for controlling communications with UEs in cooperation with other base stations. For example, the base station communications component 925 may coordinate scheduling for transmissions to one or more of the UEs 115, 215, 315, or 415 described with reference to FIG. 1, 2, 3, or 4 for various interference mitigation techniques such as beamforming or joint transmission.

Figure 10:
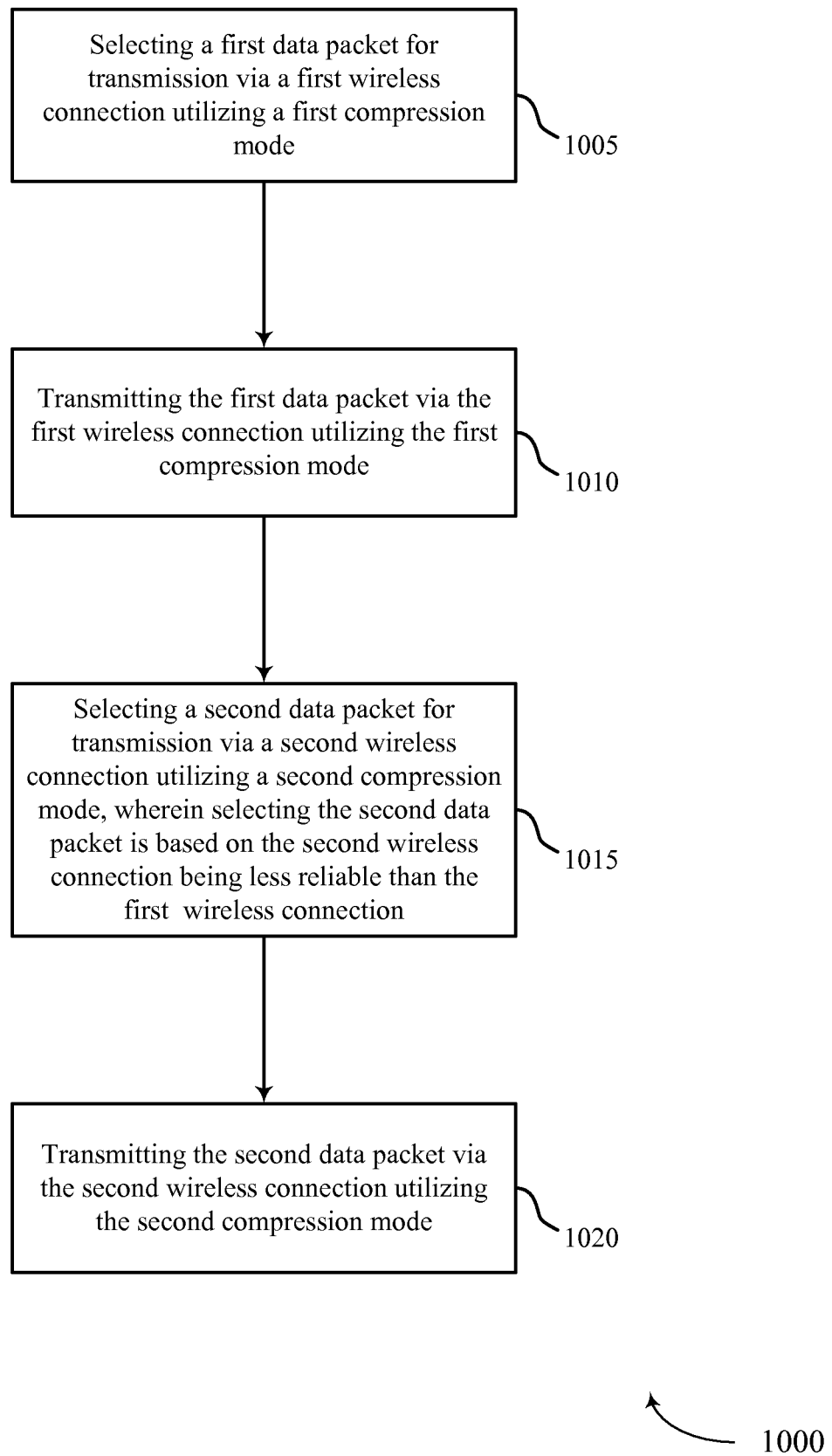
FIG. 10 shows a flowchart illustrating a method for evolved data compression scheme for unreliable transmission modes in accordance with various aspects of the present disclosure.

FIG. 10 shows a flowchart illustrating a method 1000 for evolved data compression scheme for unreliable transmission modes in accordance with various aspects of the present disclosure. The operations of method 1000 may be implemented by one or more of the base stations 105, 205, 305, 405, 805, or 905 described with reference to FIG. 1, 2, 3, 4, 5, 6, 7, 8, or 9, one or more of the UEs 115, 215, 315, 415, 815, or 915 described with reference to FIG. 1, 2, 3, 4, 5, 6, 7, 8 or 9, or their components as described with reference to FIG. 1, 2, 3, 4, 5, 6, 7, 8, or 9. For example, the operations of method 1000 may be performed by the evolved data compression components 510, 610, 710, 825, or 920 as described with reference to FIG. 5, 6, 7,8, or 9. In some examples, a base station or a UE may execute a set of codes to control the functional elements of the base station or the UE to perform the functions described below. Additionally or alternatively, the base station or the UE may perform aspects the functions described below using special-purpose hardware.

At block 1005, the method 1000 may include selecting a first data packet for transmission via a first wireless connection utilizing a first compression mode as described above with reference to FIG. 2, 3, or 4. In some examples, the operations of block 1005 may be performed by the packet selection component 620 as described above with reference to FIG. 6.

At block 1010, the method 1000 may include transmitting the first data packet via the first wireless connection utilizing the first compression mode as described above with reference to FIG. 2, 3, or 4. In some examples, the operations of block 1010 may be performed by the first compression mode component 625 as described above with reference to FIG. 6.

At block 1015, the method 1000 may include selecting a second data packet for transmission via a second wireless connection utilizing a second compression mode, wherein selecting the second data packet is based at least in part on the second wireless connection being less reliable than the first wireless connection as described above with reference to FIG. 2, 3, or 4. In some examples, the operations of block 1015 may be performed by the packet selection component 620 as described above with reference to FIG. 6.

At block 1020, the method 1000 may include transmitting the second data packet via the second wireless connection utilizing the second compression mode as described above with reference to FIG. 2, 3, or 4. In some examples, the operations of block 1020 may be performed by the second compression mode component 630 as described above with reference to FIG. 6.

Figure 11:
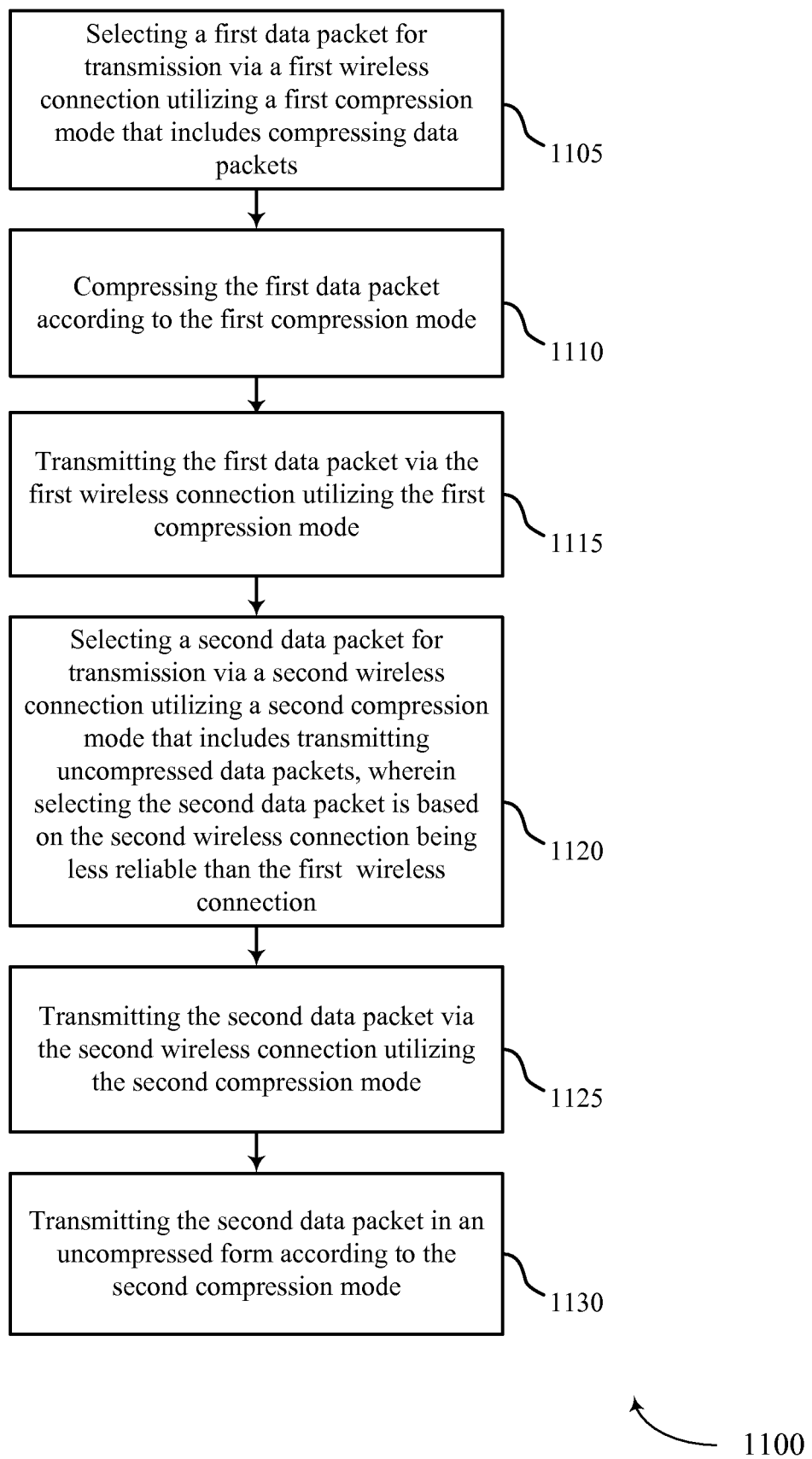
FIG. 11 shows a flowchart illustrating a method for evolved data compression scheme for unreliable transmission modes in accordance with various aspects of the present disclosure.

FIG. 11 shows a flowchart illustrating a method 1100 for evolved data compression scheme for unreliable transmission modes in accordance with various aspects of the present disclosure. The operations of method 1100 may be implemented by one or more of the base stations 105, 205, 305, 405, 805, or 905 described with reference to FIG. 1, 2, 3, 4, 5, 6, 7, 8, or 9, one or more of the UEs 115, 215, 315, 415, 815, or 915 described with reference to FIG. 1, 2, 3, 4, 5, 6, 7, 8 or 9, or their components as described with reference to FIG. 1, 2, 3, 4, 5, 6, 7, 8, or 9. For example, the operations of method 1100 may be performed by the evolved data compression components 510, 610, 710, 825, or 920 as described with reference to FIG. 5, 6, 7, or 8. In some examples, a base station or a UE may execute a set of codes to control the functional elements of the base station or the UE to perform the functions described below. Additionally or alternatively, the base station or the UE may perform aspects the functions described below using special-purpose hardware. The method 1100 may also incorporate aspects of method 1000 of FIG. 10.

At block 1105, the method 1100 may include selecting a first data packet for transmission via a first wireless connection utilizing a first compression mode as described above with reference to FIG. 2, 3, or 4. In some cases, the first compression mode comprises compressing data packets. In some examples, the operations of block 1105 may be performed by the packet selection component 620 as described above with reference to FIG. 6.

At block 1110, the method 1100 may include compressing the first data packet according to the first compression mode as described above with reference to FIG. 2, 3, or 4. In some examples, the operations of block 1110 may be performed by the first compression mode component 625 as described above with reference to FIG. 6.

At block 1115, the method 1100 may include transmitting the first data packet via the first wireless connection utilizing the first compression mode as described above with reference to FIG. 2, 3, or 4. In some examples, the operations of block 1115 may be performed by the first compression mode component 625 as described above with reference to FIG. 6.

At block 1120, the method 1100 may include selecting a second data packet for transmission via a second wireless connection utilizing a second compression mode, wherein selecting the second data packet is based at least in part on the second wireless connection being less reliable than the first wireless connection as described above with reference to FIG. 2, 3, or 4. In some cases, the second compression mode comprises transmitting uncompressed data packets. In some examples, the operations of block 1120 may be performed by the packet selection component 620 as described above with reference to FIG. 6.

At block 1125, the method 1100 may include transmitting the second data packet via the second wireless connection utilizing the second compression mode as described above with reference to FIG. 2, 3, or 4. In some examples, the operations of block 1125 may be performed by the second compression mode component 630 as described above with reference to FIG. 6.

At block 1130, the method 1100 may include transmitting the second data packet in an uncompressed form according to the second compression mode as described above with reference to FIG. 2, 3, or 4. In some examples, the operations of block 1130 may be performed by the transmitter 515 as described above with reference to FIG. 5.

Figure 12:
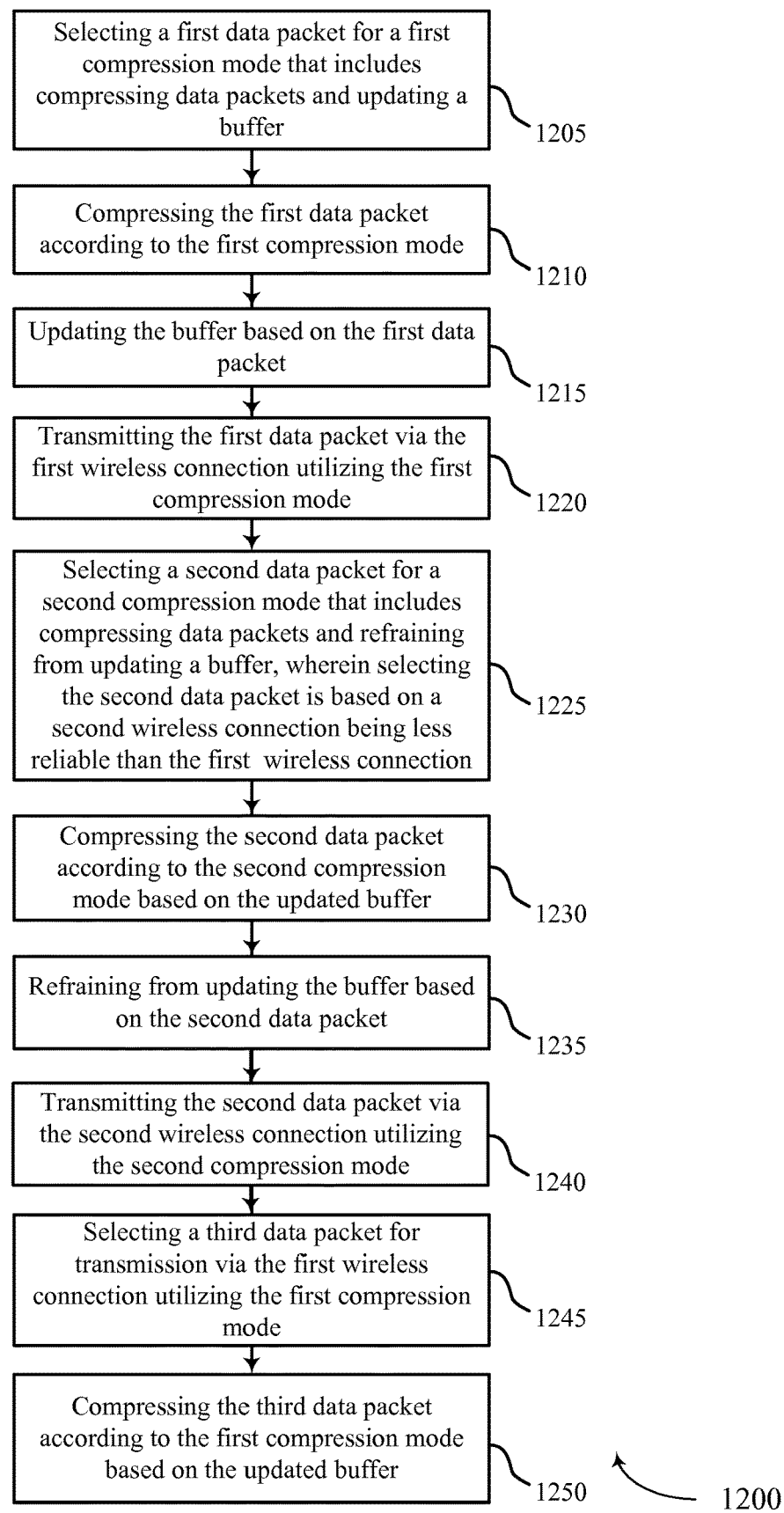
FIG. 12 shows a flowchart illustrating a method for evolved data compression scheme for unreliable transmission modes in accordance with various aspects of the present disclosure.

FIG. 12 shows a flowchart illustrating a method 1200 for evolved data compression scheme for unreliable transmission modes in accordance with various aspects of the present disclosure. The operations of method 1200 may be implemented by one or more of the base stations 105, 205, 305, 405, 805, or 905 described with reference to FIG. 1, 2, 3, 4, 5, 6, 7, 8, or 9, one or more of the UEs 115, 215, 315, 415, 815, or 915 described with reference to FIG. 1, 2, 3, 4, 5, 6, 7, 8 or 9, or their components as described with reference to FIGS. 1, 2, 3, 4, 5, 6, 7, 8, 9. For example, the operations of method 1200 may be performed by the evolved data compression components 510, 610, 710, 825, or 920 as described with reference to FIG. 5, 6, 7, or 8. In some examples, a base station or a UE may execute a set of codes to control the functional elements of the base station or the UE to perform the functions described below. Additionally or alternatively, the base station or the UE may perform aspects the functions described below using special-purpose hardware. The method 1200 may also incorporate aspects of methods 1000, and 1100 of FIGS. 10-11.

At block 1205, the method 1200 may include selecting a first data packet for transmission via a first wireless connection utilizing a first compression mode as described above with reference to FIG. 2, 3, or 4. In some examples, the first compression mode comprises compressing data packets and updating a buffer. In some examples, the operations of block 1205 may be performed by the packet selection component 620 as described above with reference to FIG. 6.

At block 1210, the method 1200 may include compressing the first data packet according to the first compression mode as described above with reference to FIG. 2, 3, or 4. In some examples, the operations of block 1210 may be performed by the first compression mode component 625 as described above with reference to FIG. 6.

At block 1215, the method 1200 may include updating the buffer based at least in part on the first data packet as described above with reference to FIG. 2, 3, or 4. In some examples, the operations of block 1215 may be performed by the compression buffer 735 as described above with reference to FIG. 7.

At block 1220, the method 1200 may include transmitting the first data packet via the first wireless connection utilizing the first compression mode as described above with reference to FIG. 2, 3, or 4. In some examples, the operations of block 1220 may be performed by the first compression mode component 625 as described above with reference to FIG. 6.

At block 1225, the method 1200 may include selecting a second data packet for transmission via a second wireless connection utilizing a second compression mode, wherein selecting the second data packet is based at least in part on the second wireless connection being less reliable than the first wireless connection as described above with reference to FIG. 2, 3, or 4. In some examples, the second compression mode comprises compressing data packets and refraining from updating a buffer. In some examples, the operations of block 1225 may be performed by the packet selection component 620 as described above with reference to FIG. 6.

At block 1230, the method 1200 may include compressing the second data packet according to the second compression mode based at least in part on the updated buffer as described above with reference to FIG. 2, 3, or 4. In some examples, the operations of block 1230 may be performed by the second compression mode component 630 as described above with reference to FIG. 6.

At block 1235, the method 1200 may include refraining from updating the buffer based on the second data packet as described above with reference to FIG. 2, 3, or 4. In some examples, the operations of block 1235 may be performed by the second compression mode component 630 as described above with reference to FIG. 6.

At block 1240, the method 1200 may include transmitting the second data packet via the second wireless connection utilizing the second compression mode as described above with reference to FIG. 2, 3, or 4. In some examples, the operations of block 1240 may be performed by the second compression mode component 630 as described above with reference to FIG. 6.

At block 1245, the method 1200 may include selecting a third data packet for transmission via the first wireless connection utilizing the first compression mode as described above with reference to FIG. 2, 3, or 4. In some examples, the operations of block 1245 may be performed by the first compression mode component 625 as described above with reference to FIG. 6.

At block 1250, the method 1200 may include compressing the third data packet according to the first compression mode based at least in part on the updated buffer and the refraining from updating the buffer based on the second data packet as described above with reference to FIG. 2, 3, or 4. In some examples, the operations of block 1250 may be performed by the first compression mode component 625 as described above with reference to FIG. 6.

Figure 13:
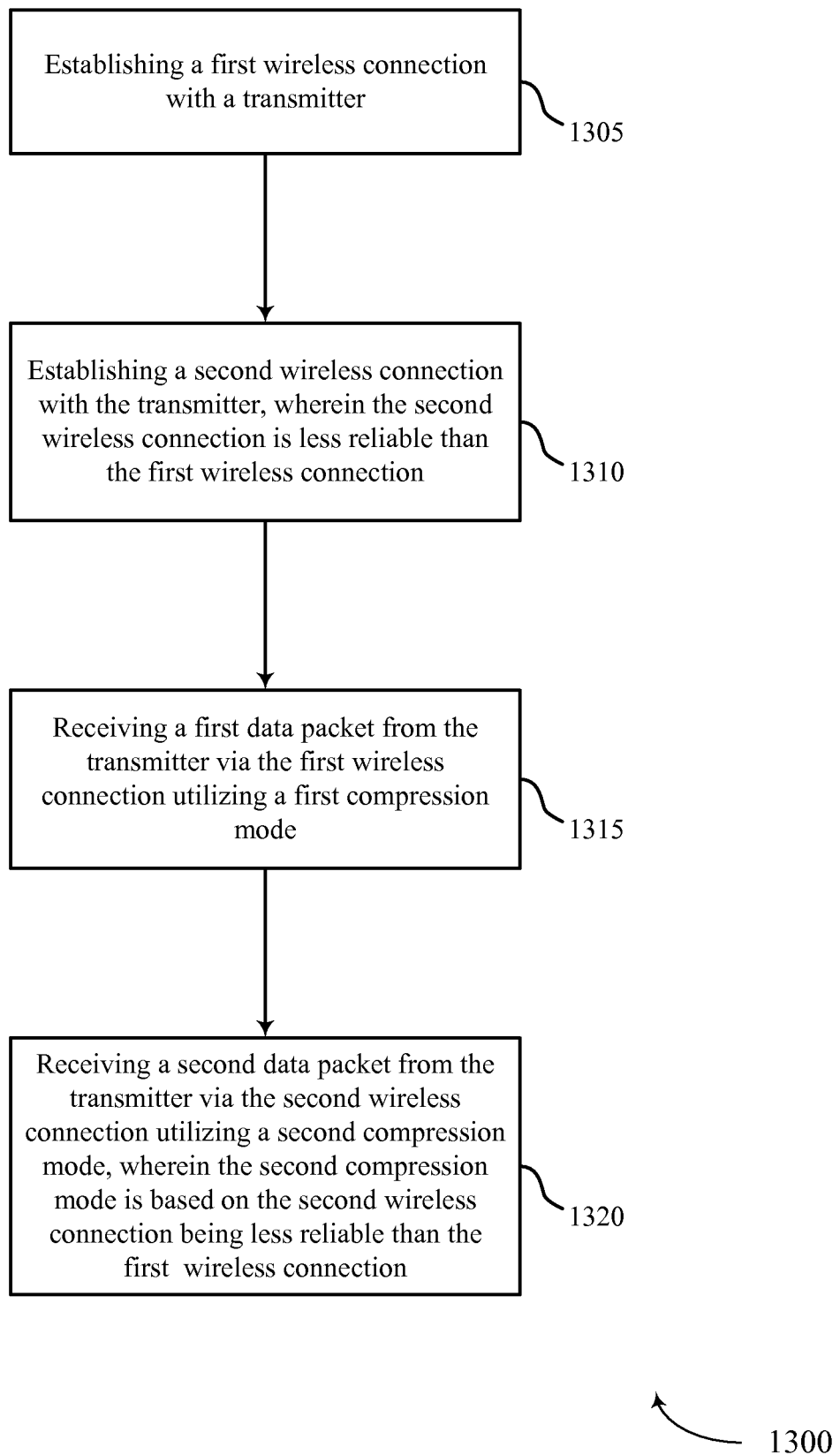
FIG. 13 shows a flowchart illustrating a method for evolved data compression scheme for unreliable transmission modes in accordance with various aspects of the present disclosure.

FIG. 13 shows a flowchart illustrating a method 1300 for evolved data compression scheme for unreliable transmission modes in accordance with various aspects of the present disclosure. The operations of method 1300 may be implemented by one or more of the base stations 105, 205, 305, 405, 805, or 905 described with reference to FIG. 1, 2, 3, 4, 5, 6, 7, 8, or 9, one or more of the UEs 115, 215, 315, 415, 815, or 915 described with reference to FIG. 1, 2, 3, 4, 5, 6, 7, 8 or 9, or their components as described with reference to FIG. 1, 2, 3, 4, 5, 6, 7, 8, or 9. For example, the operations of method 1300 may be performed by the evolved data compression components 510, 610, 710, 825, or 920 as described with reference to FIG. 5, 6, 7, or 8. In some examples, a base station or a UE may execute a set of codes to control the functional elements of the base station or the UE to perform the functions described below. Additionally or alternatively, the base station or the UE may perform aspects the functions described below using special-purpose hardware. The method 1300 may also incorporate aspects of methods 1000, 1100, and 1200 of FIGS. 10-12.

At block 1305, the method 1300 may include establishing a first wireless connection with a transmitter as described above with reference to FIG. 2, 3, or 4. In some examples, the operations of block 1305 may be performed by the first connection component 755 as described above with reference to FIG. 7.

At block 1310, the method 1300 may include establishing a second wireless connection with the transmitter, wherein the second wireless connection is less reliable than the first wireless connection as described above with reference to FIG. 2, 3, or 4. In some examples, the operations of block 1310 may be performed by the second connection component 760 as described above with reference to FIG. 7.

At block 1315, the method 1300 may include receiving a first data packet from the transmitter via the first wireless connection utilizing a first compression mode as described above with reference to FIG. 2, 3, or 4. In some examples, the operations of block 1315 may be performed by the first compression mode component 625 as described above with reference to FIG. 6.

At block 1320, the method 1300 may include receiving a second data packet from the transmitter via the second wireless connection utilizing a second compression mode, wherein the second compression mode is based at least in part on the second wireless connection being less reliable than the first wireless connection as described above with reference to FIG. 2, 3, or 4. In some examples, the operations of block 1320 may be performed by the second compression mode component 630 as described above with reference to FIG. 6.

Figure 14:
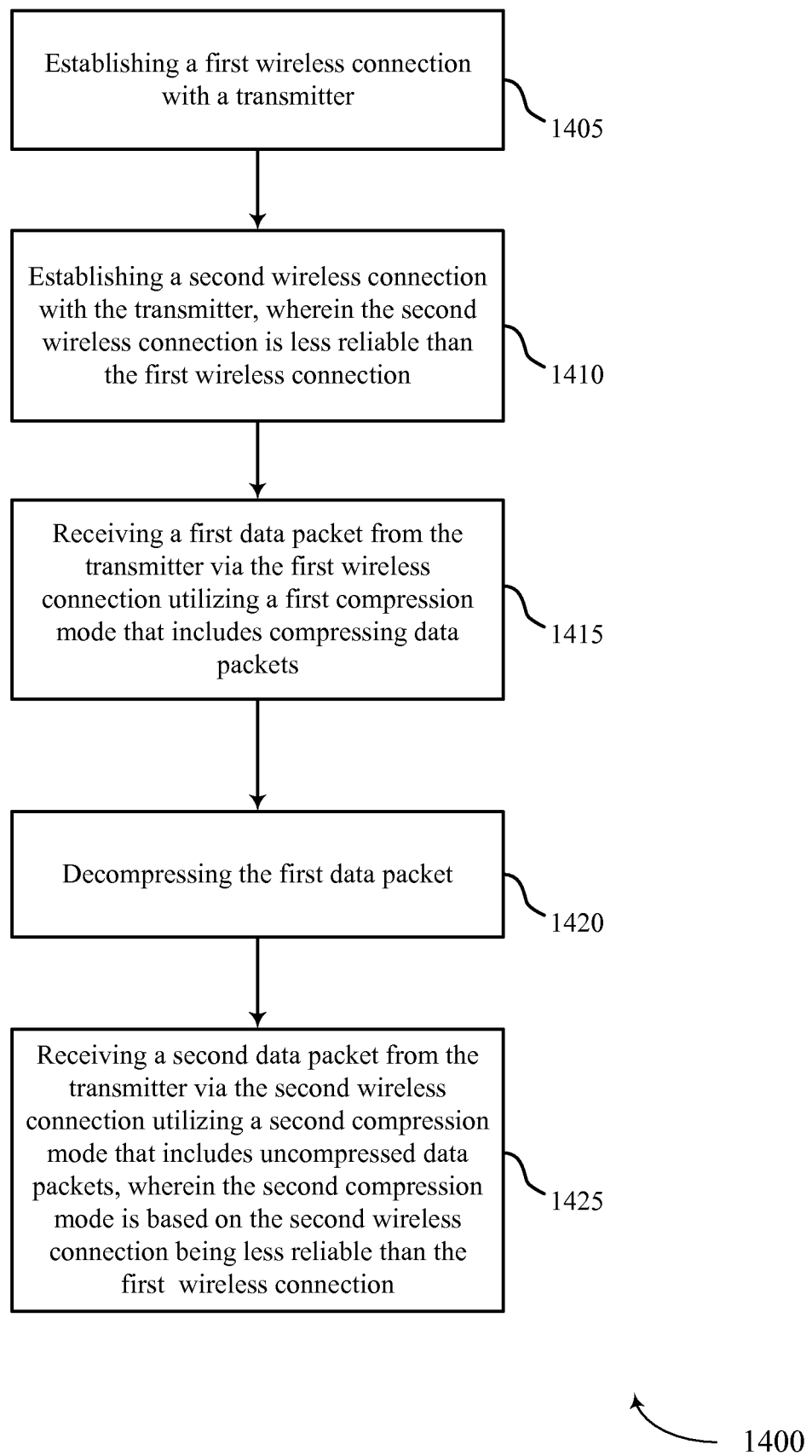
FIG. 14 shows a flowchart illustrating a method for evolved data compression scheme for unreliable transmission modes in accordance with various aspects of the present disclosure.

FIG. 14 shows a flowchart illustrating a method 1400 for evolved data compression scheme for unreliable transmission modes in accordance with various aspects of the present disclosure. The operations of method 1400 may be implemented by one or more of the base stations 105, 205, 305, 405, 805, or 905 described with reference to FIG. 1, 2, 3, 4, 5, 6, 7, 8, or 9, one or more of the UEs 115, 215, 315, 415, 815, or 915 described with reference to FIG. 1, 2, 3, 4, 5, 6, 7, 8 or 9, or their components as described with reference to FIG. 1, 2, 3, 4, 5, 6, 7, 8, or 9. For example, the operations of method 1400 may be performed by the evolved data compression components 510, 610, 710, 825, or 920 as described with reference to FIG. 5, 6, 7, or 8. In some examples, a base station or a UE may execute a set of codes to control the functional elements of the base station or the UE to perform the functions described below. Additionally or alternatively, the base station or the UE may perform aspects the functions described below using special-purpose hardware. The method 1400 may also incorporate aspects of methods 1000, 1100, 1200, and 1300 of FIGS. 10-13.

At block 1405, the method 1400 may include establishing a first wireless connection with a transmitter as described above with reference to FIG. 2, 3, or 4. In some examples, the first compression mode comprises compressing data packets. In some examples, the operations of block 1405 may be performed by the first connection component 755 as described above with reference to FIG. 7.

At block 1410, the method 1400 may include establishing a second wireless connection with the transmitter, wherein the second wireless connection is less reliable than the first wireless connection as described above with reference to FIG. 2, 3, or 4. In some examples, the operations of block 1410 may be performed by the second connection component 760 as described above with reference to FIG. 7.

At block 1415, the method 1400 may include receiving a first data packet from the transmitter via the first wireless connection utilizing a first compression mode as described above with reference to FIG. 2, 3, or 4. In some examples, the operations of block 1415 may be performed by the first compression mode component 625 as described above with reference to FIG. 6.

At block 1420, the method 1400 may include decompressing the first data packet as described above with reference to FIG. 2, 3, or 4. In some examples, the operations of block 1420 may be performed by the first compression mode component 625 as described above with reference to FIG. 6

At block 1425, the method 1400 may include receiving a second data packet from the transmitter via the second wireless connection utilizing a second compression mode, wherein the second compression mode is based at least in part on the second wireless connection being less reliable than the first wireless connection as described above with reference to FIG. 2, 3, or 4. In some examples, the second compression mode comprises transmitting uncompressed data packets and receiving the second data packet comprises: receiving the second data packet in an uncompressed form. In some examples, the operations of block 1425 may be performed by the second compression mode component 630 as described above with reference to FIG. 6.

Figure 15:
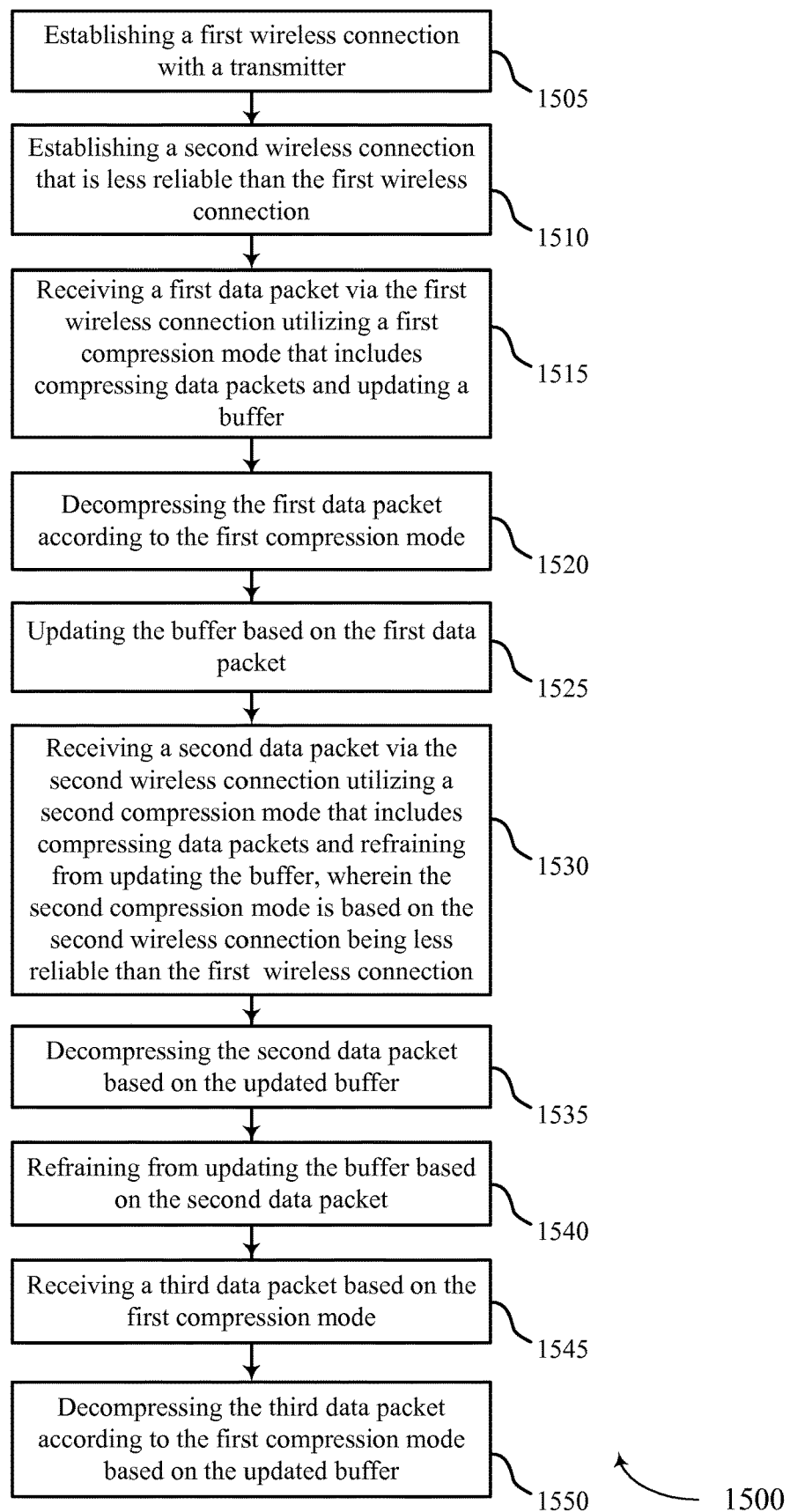
FIG. 15 shows a flowchart illustrating a method for evolved data compression scheme for unreliable transmission modes in accordance with various aspects of the present disclosure.

FIG. 15 shows a flowchart illustrating a method 1500 for evolved data compression scheme for unreliable transmission modes in accordance with various aspects of the present disclosure. The operations of method 1500 may be implemented by one or more of the base stations 105, 205, 305, 405, 805, or 905 described with reference to FIG. 1, 2, 3, 4, 5, 6, 7, 8, or 9, one or more of the UEs 115, 215, 315, 415, 815, or 915 described with reference to FIG. 1, 2, 3, 4, 5, 6, 7, 8 or 9, or their components as described with reference to FIG. 1, 2, 3, 4, 5, 6, 7, 8, or 9. For example, the operations of method 1500 may be performed by the evolved data compression components 510, 610, 710, 825, or 920 as described with reference to FIG. 5, 6, 7, or 8. In some examples, a base station or a UE may execute a set of codes to control the functional elements of the base station or the UE to perform the functions described below. Additionally or alternatively, the base station or the UE may perform aspects the functions described below using special-purpose hardware. The method 1500 may also incorporate aspects of methods 1000, 1100, 1200, 1300, and 1400 of FIGS. 10-14.

At block 1505, the method 1500 may include establishing a first wireless connection with a transmitter as described above with reference to FIG. 2, 3, or 4. In some examples, the first compression mode comprises compressing data packets and updating a buffer. In some examples, the operations of block 1505 may be performed by the first connection component 755 as described above with reference to FIG. 7.

At block 1510, the method 1500 may include establishing a second wireless connection with the transmitter, wherein the second wireless connection is less reliable than the first wireless connection as described above with reference to FIG. 2, 3, or 4. In some examples, the operations of block 1510 may be performed by the second connection component 760 as described above with reference to FIG. 7.

At block 1515, the method 1500 may include receiving a first data packet from the transmitter via the first wireless connection utilizing a first compression mode that includes compressing data packets and updating a buffer as described above with reference to FIG. 2, 3, or 4. In some examples, the operations of block 1515 may be performed by the first compression mode component 625 as described above with reference to FIG. 6.

At block 1520, the method 1500 may include decompressing the first data packet according to the first compression mode as described above with reference to FIG. 2, 3, or 4. In some examples, the operations of block 1520 may be performed by the first compression mode component 625 as described above with reference to FIG. 6.

At block 1525, the method 1500 may include updating the buffer based at least in part on the first data packet as described above with reference to FIG. 2, 3, or 4. In some examples, the operations of block 1525 may be performed by the compression buffer 735 as described above with reference to FIG. 7.

At block 1530, the method 1500 may include receiving a second data packet from the transmitter via the second wireless connection utilizing a second compression mode. In some examples, the second compression mode comprises compressing data packets and refraining from updating the buffer, wherein the second compression mode is based at least in part on the second wireless connection being less reliable than the first wireless connection as described above with reference to FIG. 2, 3, or 4. In some examples, the operations of block 1530 may be performed by the second compression mode component 630 as described above with reference to FIG. 6.

At block 1535, the method 1500 may include decompressing the second data packet based at least in part on the updated buffer as described above with reference to FIG. 2, 3, or 4. In some examples, the operations of block 1535 may be performed by the second compression mode component 630 as described above with reference to FIG. 6.

At block 1540, the method 1500 may include refraining from updating the buffer based on the second data packet as described above with reference to FIG. 2, 3, or 4. In some examples, the operations of block 1540 may be performed by the second compression mode component 630 as described above with reference to FIG. 6.

At block 1545, the method 1500 may include receiving a third data packet based on the first compression mode as described above with reference to FIG. 2, 3, or 4. In some examples, the operations of block 1545 may be performed by the first compression mode component 625 as described above with reference to FIG. 6.

At block 1550, the method 1500 may include decompressing the third data packet according to the first compression mode based at least in part on the updated buffer and the refraining from updating the buffer based on the second data packet as described above with reference to FIG. 2, 3, or 4. In some examples, the operations of block 1550 may be performed by the first compression mode component 625 as described above with reference to FIG. 6.

Thus, methods 1000, 1100, 1200, 1300, 1400, and 1500 may provide for evolved data compression scheme for unreliable transmission modes. It should be noted that methods 1000, 1100, 1200, 1300, 1400, and 1500 describe possible implementation, and that the operations and the steps may be rearranged or otherwise modified such that other implementations are possible. In some examples, aspects from two or more of the methods 1000, 1100, 1200, 1300, 1400, and 1500 may be combined.

The detailed description set forth above in connection with the appended drawings describes exemplary examples and does not represent all the examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of communication at a wireless device, comprising:
   selecting a first data packet for transmission via a first wireless connection of a first radio access technology (RAT) that utilizes a first compression mode;
   compressing the first data packet according to the first compression mode;
   transmitting the first data packet via the first wireless connection utilizing the first compression mode;
   updating the buffer using the first data packet;
   selecting a second data packet for transmission via a second wireless connection of a second RAT that utilizes a second compression mode based at least in part on wireless connections of the second RAT being less reliable than wireless connections of the first RAT, wherein the second RAT is different from the first RAT;
   applying the second compression mode to the second data packet based at least in part on the updated buffer;
   refraining from updating the buffer using the second data packet based at least in part on the wireless connections of the second RAT being less reliable than wireless connections of the first RAT; and
   transmitting the second data packet via the second wireless connection utilizing the second compression mode.

2. The method of claim 1, wherein the first wireless connection is a Long Term Evolution (LTE) connection and the second wireless connection is a Wi-Fi connection.

3. The method of claim 1, wherein the second compression mode comprises transmitting uncompressed data packets.

4. The method of claim 1, wherein the second compression mode comprises compressing data packets.

5. The method of claim 4, further comprising:
   compressing the second data packet according to the second compression mode based at least in part on the updated buffer;
   selecting a third data packet for transmission via the first wireless connection utilizing the first compression mode; and
   compressing the third data packet according to the first compression mode based at least in part on the updated buffer and the refraining from updating the buffer using the second data packet.

6. The method of claim 4, wherein the second compression mode comprises a header compression mode or a header plus payload compression mode.

7. The method of claim 4, further comprising:
   transmitting a buffer update bypass indication corresponding to the second data packet.

8. The method of claim 1, further comprising:
   transmitting a third data packet via the first wireless connection utilizing the second compression mode.

9. The method of claim 1, further comprising:
   selecting the second data packet based at least in part on a ratio of compressed and uncompressed data packets.

10. The method of claim 1, further comprising:
    indicating the first compression mode in a packet type field in a compression header of the first data packet.

11. The method of claim 1, further comprising:
indicating the second compression mode in a packet type field in a compression header of the second data packet.

12. The method of claim 1, further comprising:
transmitting a third data packet via the first wireless connection utilizing the first compression mode;
receiving a lost packet message indicating a serial number of the third data packet; and
retransmitting the third data packet based at least in part on the lost packet message, using a packet data convergence protocol (PDCP).

13. The method of claim 1, further comprising:
determining that a failure condition has been satisfied for the second data packet; and
transmitting the second data packet via the first wireless connection based at least in part on the determination that the failure condition has been satisfied.

14. The method of claim 13, wherein the failure condition comprises a time-out timer.

15. The method of claim 13, wherein the failure condition comprises a number of packets transmitted via the first wireless connection with a sequence number higher than a sequence number of the second data packet.

16. A method of communication at a wireless device, comprising:
establishing a first wireless connection with a transmitter utilizing a first radio access technology (RAT);
establishing a second wireless connection with the transmitter utilizing a second RAT different from the first RAT, wherein wireless connections of the second RAT are less reliable than wireless connections of the first RAT;
receiving a first data packet from the transmitter via the first wireless connection utilizing a first compression mode;
decompressing the first data packet according to the first compression mode;
updating the buffer using the first data packet;
receiving a second data packet from the transmitter via the second wireless connection utilizing a second compression mode, wherein the second compression mode is based at least in part on wireless connections of the second RAT being less reliable than wireless connections of the first RAT;
decompressing the second data packet based at least in part on the updated buffer;
refraining from updating the buffer using the second data packet based at least in part on the wireless connections of the second RAT being less reliable than wireless connections of the first RAT; and
applying the second compression mode to the second data packet based at least in part on the updated buffer.

17. The method of claim 16, wherein the first wireless connection is a Long Term Evolution (LTE) connection and the second wireless connection is a Wi-Fi connection.

18. The method of claim 16, wherein the second compression mode comprises transmitting uncompressed data packets.

19. The method of claim 16, further comprising:
receiving a third data packet based on the first compression mode; and
decompressing the third data packet according to the first compression mode based at least in part on the updated buffer and the refraining from updating the buffer using the second data packet.

20. The method of claim 16, wherein the second compression mode comprises a header compression mode or a header plus payload compression mode.

21. The method of claim 16, further comprising:
receiving a third data packet via the first wireless connection utilizing the second compression mode.

22. The method of claim 16, further comprising:
identifying the first compression mode based at least in part on a packet type field in a compression header of the first data packet.

23. The method of claim 16, further comprising:
identifying the second compression mode based at least in part on a packet type field in a compression header of the second data packet.

24. The method of claim 16, further comprising:
determining that a third data packet has been lost;
transmitting a lost packet message to an access network indicating a serial number of the third data packet; and
receiving a retransmission corresponding to the third data packet based at least in part on the lost packet message, using a packet data convergence protocol (PDCP).

25. An apparatus for communication at a wireless device, comprising:
a processor;
memory in electronic communication with the processor; and
instructions stored in the memory; wherein the instructions are executable by the processor to:
select a first data packet for transmission via a first wireless connection of a first radio access technology (RAT) that utilizes a first compression mode;
compress the first data packet according to the first compression mode;
transmit the first data packet via the first wireless connection utilizing the first compression mode;
update the buffer using the first data packet;
select a second data packet for transmission via a second wireless connection of a second RAT that utilizes a second compression mode based at least in part on wireless connections of the second RAT being less reliable than wireless connections of the first RAT, wherein the second RAT is different from the first RAT;
apply the second compression mode to the second data packet based at least in part on the updated buffer;
refrain from updating the buffer using the second data packet based at least in part on the wireless connections of the second RAT being less reliable than wireless connections of the first RAT; and
transmit the second data packet via the second wireless connection utilizing the second compression mode.

26. The apparatus of claim 25, wherein the first wireless connection is a Long Term Evolution (LTE) connection and the second wireless connection is a Wi-Fi connection.

27. An apparatus for communication at a wireless device, comprising:
a processor;
memory in electronic communication with the processor; and
instructions stored in the memory; wherein the instructions are executable by the processor to:
establish a first wireless connection with a transmitter utilizing a first radio access technology (RAT);
establish a second wireless connection with the transmitter utilizing a second RAT different from the first RAT, wherein wireless connections of the second RAT are less reliable than wireless connections of the first RAT;

receive a first data packet from the transmitter via the first wireless connection utilizing a first compression mode;

decompress the first data packet according to the first compression mode;

update the buffer using the first data packet;

receive a second data packet from the transmitter via the second wireless connection utilizing a second compression mode, wherein the second compression mode is based at least in part on wireless connections of the second RAT being less reliable than wireless connections of the first RAT;

decompress the second data packet based at least in part on the updated buffer;

refrain from updating the buffer using the second data packet based at least in part on the wireless connections of the second RAT being less reliable than wireless connections of the first RAT; and apply the second compression mode to the second data packet based at least in part on the updated buffer.

* * * * *